US012763659B2

(12) United States Patent
Park et al.

(10) Patent No.: US 12,763,659 B2
(45) Date of Patent: Oct. 13, 2026

(54) DC-DC CONVERTER AND DISPLAY DEVICE INCLUDING THE DC-DC CONVERTER, AND ELECTRONIC DEVICE INCLUDING THE DISPLAY DEVICE

(71) Applicant: Samsung Display Co., LTD., Yongin-si (KR)

(72) Inventors: Sungchun Park, Yongin-si (KR); Jeongmin Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/967,929

(22) Filed: Dec. 4, 2024

(65) Prior Publication Data

US 2025/0286446 A1 Sep. 11, 2025

(30) Foreign Application Priority Data

Mar. 6, 2024 (KR) ........................ 10-2024-0031944

(51) Int. Cl.

| | |
|---|---|
| ***H02M 1/14*** | (2006.01) |
| ***H02M 1/00*** | (2006.01) |
| *G09G 3/32* | (2016.01) |
| *H02M 3/158* | (2006.01) |

(52) U.S. Cl.

CPC ........... *H02M 1/0032* (2021.05); *H02M 1/14* (2013.01); *G09G 3/32* (2013.01); *G09G 2320/0247* (2013.01); *H02M 3/158* (2013.01)

(58) Field of Classification Search

CPC ...... H02M 1/0032; H02M 1/14; H02M 3/158; H02M 1/0067; H02M 1/007; G09G 3/32; G09G 2320/0247

See application file for complete search history.

(56) References Cited

U.S. PATENT DOCUMENTS

| | | | | |
|---|---|---|---|---|
| 9,535,440 B2 | | 1/2017 | Seo et al. | |
| 2016/0260382 A1 | * | 9/2016 | Choi | G09G 3/3258 |
| 2022/0069715 A1 | * | 3/2022 | Karri | H02M 3/1582 |
| 2022/0255537 A1 | * | 8/2022 | Shreeve | H03K 17/063 |
| 2023/0059963 A1 | * | 2/2023 | Yoon | H02M 1/0006 |

FOREIGN PATENT DOCUMENTS

| | | |
|---|---|---|
| KR | 1020170101375 A | 9/2017 |
| KR | 101878175 B1 | 8/2018 |
| KR | 1020210153803 A | 12/2021 |
| KR | 1020230070105 A | 5/2023 |

* cited by examiner

*Primary Examiner* — Dennis P Joseph

(74) *Attorney, Agent, or Firm* — CANTOR COLBURN LLP

(57) ABSTRACT

A DC-DC converter includes a first switching element, a second switching element connected to the first switching element, an inductor connected to the first switching element and the second switching element, and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current. The threshold current is adjusted based on the switching control signal.

13 Claims, 19 Drawing Sheets

FIG. 10

| DCODE | ITH | VCODE | TMIN_ON |
|---|---|---|---|
| 000 | 5mA | 250mV | 20ns |
| 001 | 10mA | 300mV | 40ns |
| 010 | 15mA | 350mV | 60ns |
| 011 | 20mA | 400mV | 80ns |
| 100 | 25mA | 450mV | 100ns |
| 101 | 30mA | 500mV | 120ns |

ITH: 15mA IPL: 10mA

ITH: 15mA IPL: 15mA

ITH: 20mA IPL: 5mA

DC-DC CONVERTER AND DISPLAY DEVICE INCLUDING THE DC-DC CONVERTER, AND ELECTRONIC DEVICE INCLUDING THE DISPLAY DEVICE

This application claims priority to Korean Patent Application No. 10-2024-0031944 filed on Mar. 6, 2024, and all the benefits accruing therefrom under 35 U.S.C. § 119, the content of which in its entirety is herein incorporated by reference.

BACKGROUND

1. Field

Embodiments of the present invention relates to a DC-DC converter and a display device including the DC-DC converter, and an electronic device including the display device. More particularly, the present invention relates to a DC-DC converter, a display device, and an electronic device for operating in a low power mode or a normal mode.

2. Description of the Related Art

In general, a display device may include a display panel and a DC-DC converter. The DC-DC converter may generate a panel power voltage using an input voltage and provide the panel power voltage to the display panel. The display panel may display an image using the panel power voltage.

The DC-DC converter may operate in a low power mode or a normal mode depending on a load, which is the panel current, based on a threshold current. For example, when the load is less than the threshold current, the DC-DC converter may operate in the low power mode. For example, the low power mode may be a Pulse Skip Mode (PSM). When the DC-DC converter operates in the pulse skip mode, a switching of switching elements included in the DC-DC converter may be skipped such that the switching may decrease, and a power consumption due to the switching may decrease.

When the threshold current is large, a power consumption of the DC-DC converter may decrease. However, the skipped switching of the switching elements may be large, a ripple of the panel power voltage may increase, and a luminance of the image may fluctuate. Accordingly, a flicker may be generated in the image, and a display quality of the display device may decrease.

Therefore, it may be important to control the threshold current such that the flicker may be prevented in the image while the power consumption of the DC-DC converter is reduced.

SUMMARY

Embodiments of the present invention provide a DC-DC converter for a DC-DC converter for adjusting a threshold current such that a power consumption is low while a preventing flicker in a low power mode.

Embodiments of the present invention provide a display device including the DC-DC converter.

Embodiments of the present invention provide an electronic device including the display device In an embodiment of a DC-DC converter according to the present invention, the DC-DC converter includes a first switching element, a second switching element connected to the first switching element, an inductor connected to the first switching element and the second switching element, and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current. The threshold current is adjusted based on the switching control signal.

In an embodiment, the low power mode may be a Pulse Skip Mode (PSM), and the normal mode may be a Discontinuous Conduction Mode (DCM) or a Continuous Conduction Mode (CCM).

In an embodiment, when the load is less than the threshold current, the switching controller may be configured to operate in the low power mode, and when the load is greater than or equal to the threshold current, the switching controller may be configured to operate in the normal mode.

In an embodiment, the first switching element may be turned on in response to a switching control signal having an on-duty, and the second switching element may be turned on in response to a switching control signal having an off-duty.

In an embodiment, the DC-DC converter may adjust the threshold current by adjusting a minimum on-time of the switching control signal.

In an embodiment, the DC-DC converter may adjust a ripple of the panel power voltage by adjusting the minimum on-time of the switching control signal.

In an embodiment, the DC-DC converter may adjust a number of pulses of a switching control signal to be skipped by adjusting the minimum on-time of the switching control signal and resetting the switching control signal based on the reset signal.

In an embodiment, the DC-DC converter may further include a first skip comparator configured to compare a control voltage including information on the panel power voltage with a code voltage to generate a first skip signal, and the reset signal may be generated based on the first skip signal.

In an embodiment, the DC-DC converter may adjust the minimum on-time of the switching control signal based on the code voltage.

In an embodiment, the DC-DC converter may further include a digital-to-analog converter configured to generate the code voltage based on a digital code, and the code voltage may be adjusted based on the digital code.

In an embodiment, the DC-DC converter may further include a second skip comparator configured to compare a sum voltage including information on an inductor current flowing in the inductor with the control voltage to generate a second skip signal, and a logical sum circuit configured to perform a logical sum operation on the first skip signal and the second skip signal to generate the reset signal, and the reset signal may be generated based on the first skip signal and the second skip signal.

In an embodiment, the DC-DC converter may further include a first logical product circuit configured to mask the switching control signal using a first inverted skip signal which is an inverted signal of the first skip signal.

In an embodiment, the DC-DC converter may further include a skip clock signal generator configured to generate a skip clock signal based on a digital code and the switching control signal, and a clock inverter configured to invert the skip clock signal to generate an inverted skip clock signal, and the reset signal may be generated based on the inverted skip clock signal.

In an embodiment, the DC-DC converter may further include a first skip comparator configured to compare a control voltage including information on the panel power voltage with a reference voltage to generate a first skip signal, and a second skip comparator configured to compare a sum voltage including information on an inductor current flowing in the inductor with the control voltage to generate a second skip signal, and the reset signal may be generated based on the inverted skip clock signal, the first skip signal, and the second skip signal.

In an embodiment, the DC-DC converter may further include a second logical product circuit configured to perform a logical product operation on the inverted skip clock signal and the second skip signal to generate a third skip signal, and a logical sum circuit configured to perform a logical sum operation on the first skip signal and the third skip signal to generate the reset signal.

In an embodiment, the DC-DC converter may further include a first skip comparator configured to compare a control voltage including information on the panel power voltage with a reference voltage to generate a first skip signal, and the reset signal may be generated based on the first skip signal.

In an embodiment, the DC-DC converter may further include a first logical product circuit configured to mask the switching control signal using a first inverted skip signal which is an inverted signal of the first skip signal.

In an embodiment of a display device according to the present invention, the display device includes a display panel including pixels, and a DC-DC converter configured to generate a panel power voltage using an input voltage to provide to the display panel. The DC-DC converter includes a first switching element, a second switching element connected to the first switching element, an inductor connected to the first switching element and the second switching element, and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current. The threshold current is adjusted based on the switching control signal.

In an embodiment, the DC-DC converter may adjust the threshold current by adjusting a minimum on-time of the switching control signal.

In an embodiment, the DC-DC converter may adjust a ripple of the panel power voltage by adjusting the minimum on-time of the switching control signal.

In an embodiment of an electronic device according to the present invention, the electronic device includes a display panel including pixels, a DC-DC converter configured to generate a panel power voltage using an input voltage to provide to the display panel, and a power supply configured to provide a power to display panel and DC-DC converter. The DC-DC converter includes a first switching element, a second switching element connected to the first switching element, an inductor connected to the first switching element and the second switching element, and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current. The threshold current is adjusted based on the switching control signal.

According to the DC-DC converter, the display device, and the electronic device, the threshold current may be adjusted based on the switching control signal. Accordingly, the threshold current may be adjusted such that a flicker in the image is effectively prevented while a power consumption is reduced.

BRIEF DESCRIPTION OF THE DRAWINGS

The above and other features of embodiments of the present invention will become more apparent by describing in detailed embodiments thereof with reference to the accompanying drawings, in which:

FIG. 10 is a table illustrating a threshold current depending on a digital code;

DETAILED DESCRIPTION

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, the present invention will be described in more detail with reference to the accompanying drawings.

Figure 1:
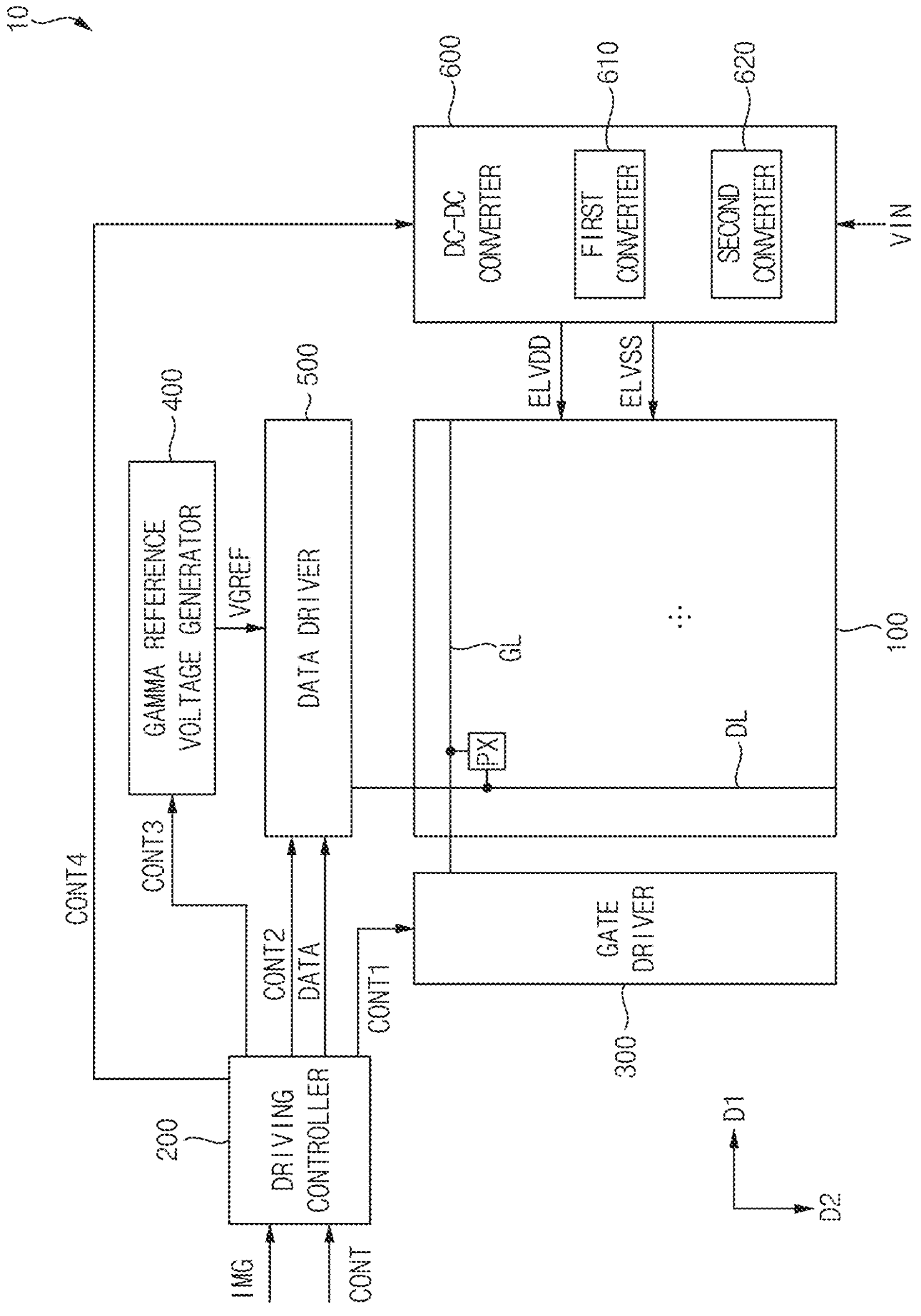
FIG. 1 is a block diagram illustrating a display device of FIG. 1.

FIG. 1 is a block diagram illustrating a display device 10 of FIG. 1.

Referring to FIG. 1, a display device 10 may include a display panel 100 and a display panel driver. The display panel driver may include a driving controller 200, a gate driver 300, a gamma reference voltage generator 400, a data driver 500, and a DC-DC converter 600.

The display panel 100 may include a display area for displaying an image and a peripheral area disposed adjacent to the display area.

The display panel 100 may include gate lines GL, data lines DL, pixels PX electrically connected to the gate lines GL and the data lines DL, respectively. The gate lines GL may extend in a first direction D1, and the data lines DL may extend in a second direction D2 crossing the first direction D1.

The driving controller 200 may receive input image data IMG and an input control signal CONT from an external device (not shown). For example, the input image data may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT. The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the DC-DC converter 600 based on the input control signal CONT, and output the fourth control signal CONT4 to the DC-DC converter 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The DC-DC converter 600 may receive the fourth control signal CONT4 from the driving controller 200, and may receive an input voltage VIN from an external device (not shown) in response to the fourth control signal CONT4. The DC-DC converter 600 may generate a panel power voltage ELVDD, ELVSS using the input voltage VIN and provide the panel power voltage ELVDD, ELVSS to the display panel 100. For example, the DC-DC converter 600 may switch switching elements included in the DC-DC converter 600 to generate an inductor current by, and may generate the panel power voltage ELVDD, ELVSS based on the inductor current. The panel power voltage may include a first power voltage ELVDD and a second power voltage ELVSS, and the first power voltage ELVDD may be greater than the second power voltage ELVSS.

The DC-DC converter 600 may include a first converter 610 and a second converter 620. The first converter 610 may generate the first power voltage ELVDD using the input voltage VIN. The second converter 620 may generate the second power voltage ELVSS using the input voltage VIN.

In an embodiment, the first converter 610 may be a boost converter. When the first converter 610 is a boost converter, the first converter 610 may boost the input voltage VIN to generate the first power voltage ELVDD.

In an embodiment, the second converter 620 may be an inverting buck-boost converter. When the second converter 620 is the inverting buck-boost converter, the second converter 620 may boost or lower the input voltage VIN to generate the second power voltage ELVSS.

Figure 2:
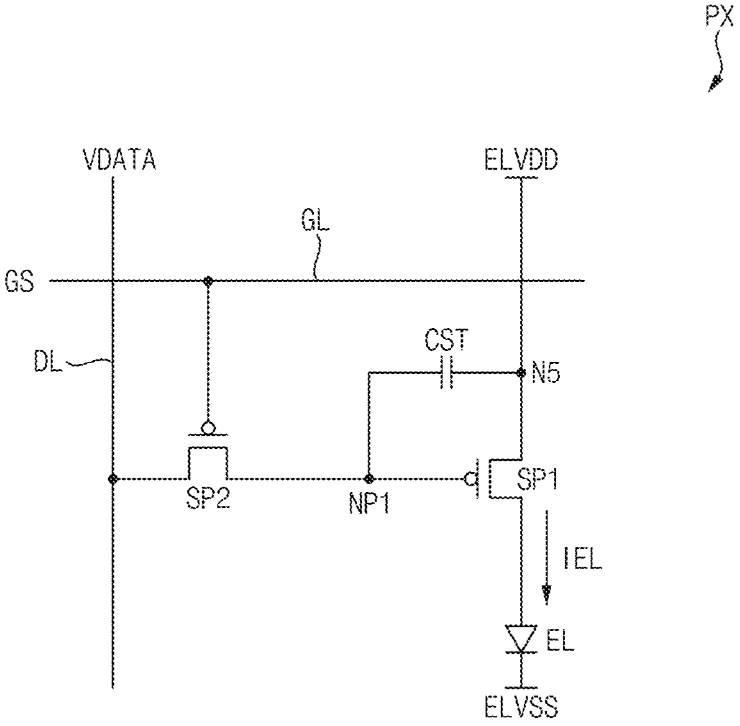
FIG. 2 is a circuit diagram illustrating an example of a pixel of FIG. 1.
Figure 3:
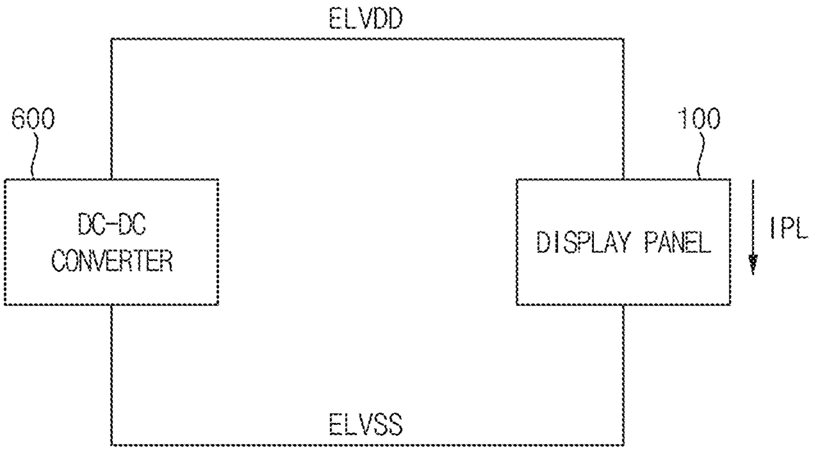
FIG. 3 is a conceptual diagram explaining a load IPL flowing in a display panel of FIG. 1.

FIG. 2 is a circuit diagram illustrating an example of a pixel PX of FIG. 1. FIG. 3 is a conceptual diagram explaining a load IPL flowing in a display panel 100 of FIG. 1.

Referring to FIGS. 1 to 3, the pixel PX may include a first pixel switching element SP1, a second pixel switching element SP2, a storage capacitor CST, and a light emitting element EL.

The first pixel switching element SP1 may include a gate terminal connected to a first pixel node NP1, a first terminal for receiving the first power voltage ELVDD, and a second terminal connected to an anode of the light emitting element EL. The first pixel switching element SP1 may generate a driving current IEL based on a difference between a voltage of the gate terminal and a voltage of the first terminal.

The second pixel switching element SP2 may include a gate terminal connected to the gate line GL to receive the gate signal GS, a first terminal connected to the data line DL to receive the data voltage VDATA, and a second terminal connected to the first pixel node NP1. The second pixel switching element SP2 may provide the data voltage VDATA to the first pixel node NP1 in response to the gate signal GS.

The storage capacitor CST may include a first terminal for receiving the first power voltage ELVDD and a second terminal connected to the first pixel node NP1. The storage capacitor CST may store the data voltage VDATA.

The light emitting element EL may include the anode connected to the second terminal of the first pixel switching element SP1 and a cathode for receiving the second power voltage ELVSS. The light emitting element EL may emit a light based on the driving current IEL. A luminance of the image may be determined depending on an intensity of the driving current IEL.

As shown in FIG. 2, the first pixel switching element SP1 and the second pixel switching element SP2 are shown as P-type transistors, but the present invention is not limited thereto. The first pixel switching element SP1 and the second pixel switching element SP2 may be N-type transistors in another embodiment. In addition, the pixel PX in FIG. 2 is shown as including two pixel switching elements SP1, SP2 and one capacitor CST, but the present invention is not limited thereto. The pixel PX may include at least three or more pixel switching elements or at least two or more capacitors in another embodiment.

As shown in FIG. 2, one pixel PX may generate the driving current IEL using the first power voltage ELVDD and the second power voltage EVLSS. As shown in FIG. 3, the display panel 100 may include pixels PX and may generate a panel current IPL using the first power voltage ELVDD and the second power voltage EVLSS. The panel current IPL may be referred to as a "load". That is, the driving current IEL may be a value of a current per pixel PX, and the load IPL may be a value of a current per display panel 100.

Depending on a size of the display panel 100, a load IPL for expressing the same grayscale may be different. For example, for 10-grayscale, the driving current IEL may be equal for each pixel PX. However, depending on the size of the display panel 100, a number of pixels PX may be different, and the load IPL may be different.

Figure 4:
FIG. 4 is a conceptual diagram explaining a low power mode.

FIG. 4 is a conceptual diagram explaining a low power mode.

Referring to FIGS. 1 to 4, the display device 10 may operate in an always-on display AOD mode in which the display panel 100 displays a time image, a date image, etc. even during a standby or sleep state.

Since the display device 10 operates in a low grayscale and/or a low luminance in the always-on display AOD mode, the display device 10 may require a low power in the always-on display AOD mode. Therefore, the DC-DC converter 600 may operate in a normal mode or a low power mode. The low power mode may be a mode for reducing a power consumption of the DC-DC converter 600.

Although FIG. 4 exemplifies only the always-on display AOD mode as an example in which the DC-DC converter 600 operates in the low power mode, the present invention is not limited thereto. The low power mode of the DC-DC converter 600 may be applied in various embodiments where the display device 10 requires the low power. However, for a convenience of an explanation, a case where the display device 10 requires the low power will be described later based on the always-on display mode AOD. In addition, the DC-DC converter 600 according to the embodiments of the present invention may be applied to both the first converter 610 and the second converter 620, but for the convenience of the explanation, a case where the second converter 620 of the DC-DC converter 600 operates in the low power mode will be described later.

Figure 5:
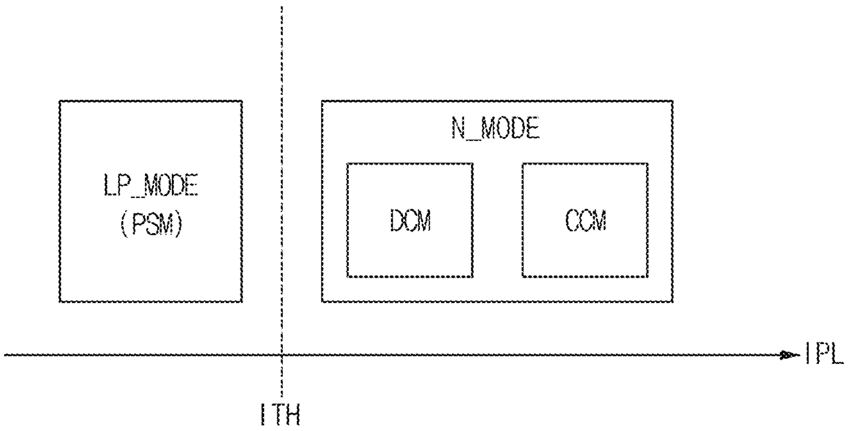
FIG. 5 is a conceptual diagram explaining a low power mode and a normal mode of a second converter of FIG. 1 depending on a load of FIG. 3.
Figure 6:
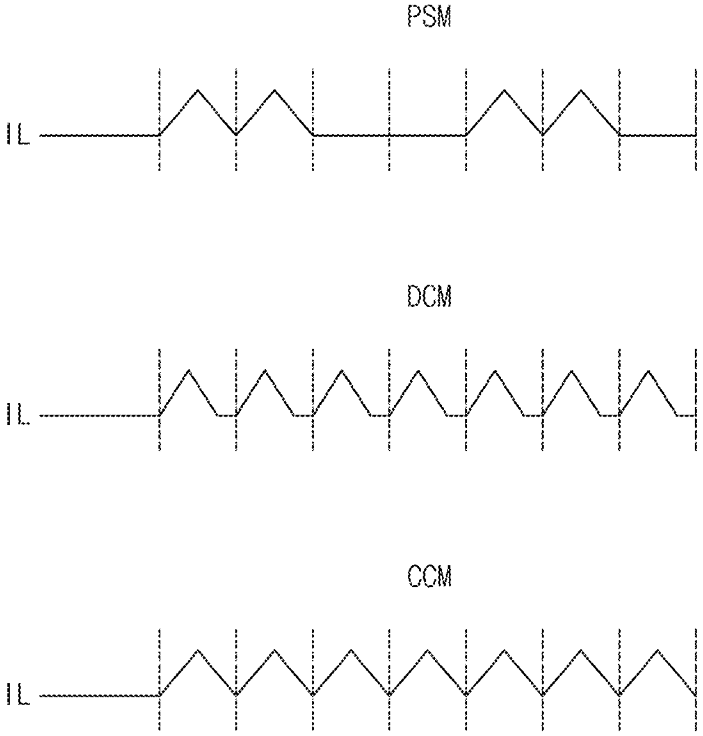
FIG. 6 is a conceptual diagram explaining a pulse skip mode of a low power mode and a discontinuous conduction mode and a continuous conduction mode of a normal mode of FIG. 5.

FIG. 5 is a conceptual diagram explaining a low power mode LP_MODE and a normal mode N_MODE of a second converter 620 of FIG. 1 depending on a load IPL of FIG. 3. FIG. 6 is a conceptual diagram explaining a pulse skip mode PSM of a low power mode LP_MODE and a discontinuous conduction mode DCM and a continuous conduction mode CCM of a normal mode N_MODE of FIG. 5.

Referring to FIGS. 1 to 6, as described above, the second converter 620 may generate the second power voltage ELVSS using the input voltage VIN, and the display panel 100 may generate the load IPL using the second power voltage ELVSS.

When the display device 10 operates in the always-on display mode AOD, the display device 10 may operate at the low grayscale and/or a low luminance, and thus the load IPL may decrease. Therefore, a mode of the second converter 620 may be determined based on the load IPL.

Referring to FIG. 5, for example, the mode of the second converter 620 may be switched between the normal mode N_MODE and the low power mode LP_MODE based on a threshold current ITH. When the load IPL is less than the threshold current ITH, the mode of the second converter 620 may be the low power mode LP_MODE. When the load IPL is greater than or equal to the threshold current ITH, the mode of the second converter 620 may be the normal mode N_MODE.

In an embodiment, the low power mode may be a pulse skip mode PSM, and the normal mode may be a discontinuous conduction mode DCM or a continuous conduction mode CCM.

Referring to FIG. 6, in the pulse skip mode PSM, the switching of the switching elements included in the second converter 620 may be skipped, and accordingly, the inductor current IL may not have a pulse in some periods.

In the discontinuous conduction mode DCM, the switching of the switching elements included in the second converter 620 is not skipped, but the inductor current IL may discontinuously increase and decrease.

In the continuous conduction mode CCM, the switching of the switching elements included in the second converter 620 is not skipped, but the inductor current IL may continuously increase and decrease.

As an area of the inductor current IL shown in FIG. 6 becomes smaller, the power consumption of the second converter 620 may decrease. Therefore, the power consumption of the second converter 620 in the pulse skip mode PSM may be less than the power consumption of the second converter 620 in the discontinuous conduction mode DCM. The power consumption of the second converter 620 in the discontinuous conduction mode DCM may be less than the power consumption of the second converter 620 in the continuous conduction mode CCM.

Figure 7:
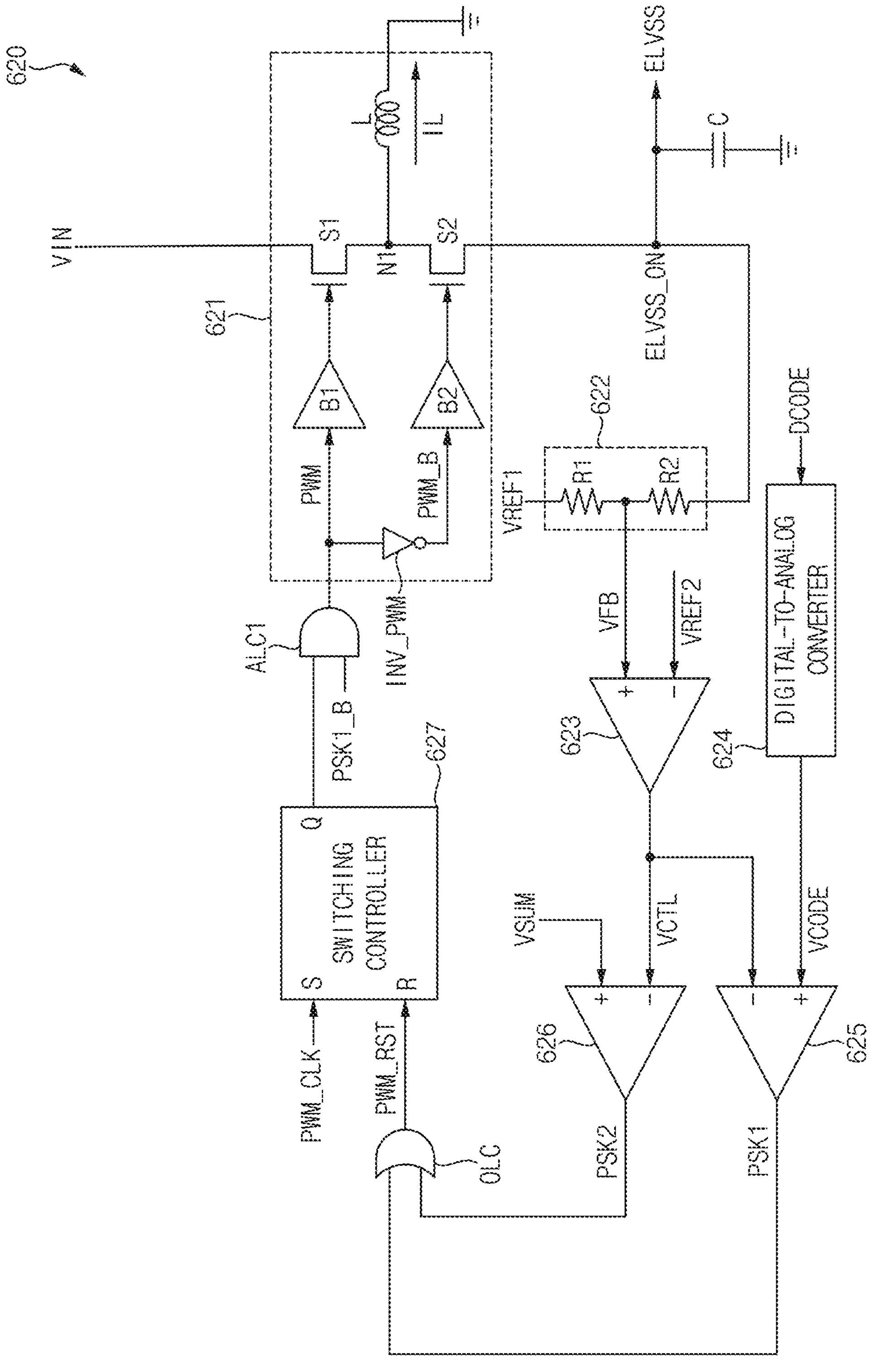
FIG. 7 is a block diagram illustrating a second converter according to an embodiment of the present invention.

FIG. 7 is a block diagram illustrating a second converter 620 according to an embodiment of the present invention.

Referring to FISG. 1 to 7, a second converter 620 may receive an input voltage VIN and generate a second power voltage ELVSS using the input voltage VIN. The second converter 620 may operate in a low power mode LP_MODE or a normal mode N_MODE depending on a load IPL based on a threshold current ITH.

The second converter 620 may include a switcher 621, a feedback voltage generator 622, an amplifier 623, a digital-to-analog converter 624, a first comparator 625, a second comparator 626, a switching controller 627, a logical sum circuit OLC, and a capacitor C.

The switcher 621 may receive a switching control signal PWM and the input voltage VIN. The switcher 621 may include a first switching element S1, a second switching element S2 connected to the first switching element S1, an inductor L connected to the first switching element S1 and the second switching element S2, and a switching inverter INV_PWM connected to the second switching element S2.

The first switching element S1 may include a gate terminal for receiving the switching control signal PWM, a first terminal for receiving the input voltage VIN, and a second terminal connected to a first node N1. The switching inverter INV_PWM may invert the switching control signal PWM to generate an inverted switching control signal PWM_B. The second switching element S2 may include a gate terminal for receiving the inverted switching control signal PWM_B, a first terminal connected to the first node N1, and a second terminal connected to an output node ELVSS_ON. The inductor L may include a first terminal connected to the first node N1 and a second terminal connected to ground. Here, the switching control signal PWM may be a Pulse Width Modulation (PWM) signal. Therefore, a pulse width of the switching control signal PWM and a pulse width of the inverted switching control signal PWM_B may be modulated.

The switcher 621 may further include a first buffer B1 which transmits the switching control signal PWM to the first switching element S1 and a second buffer B2 which transmits the inverted switching control signal PWM_B to the second switching element S2.

As shown in FIG. 7, the first switching element S1 and the second switching element S2 are shown as N-type transistors, but the present invention is not limited thereto. The first switching element S1 and the second switching element S2 may be P-type transistors in another embodiment.

The first switching element S1 may be turned on in response to a switching control signal PWM having an on-duty (i.e., a high level), and the second switching element S2 may be turned on in response to a switching control signal PWM having an off-duty (i.e., a low level). When the first switching element S1 is turned on and the second switching element S2 is turned off, an inductor current IL flowing in the inductor L may be generated, and an electromotive force may be generated in the inductor L by the inductor current IL. When the first switching element S1 is turned off and the second switching element S2 is turned on in response to the switching control signal PWM having the low level after the electromotive force is generated in the inductor L, the input voltage VIN may be converted into the second power voltage ELVSS, and the second power voltage ELVSS may be output from the output node ELVSS_ON. Here, the capacitor C may be connected to the output node ELVSS_ON.

The feedback voltage generator 622 may include a first resistor R1 and a second resistor R2. One terminal of the first resistor R1 and one terminal of the second resistor R2 may be connected to each other, the other terminal of the first resistor R1 may receive a first reference voltage VREF1, and the other terminal of the second resistor R2 may be connected to the output node ELVSS_ON to receive the second power voltage ELVSS. Therefore, the feedback voltage generator 622 may generate a voltage between the first reference voltage VREF1 and the second power voltage ELVSS as a feedback voltage VFB.

The amplifier 623 may include a non-inverting input terminal for receiving the feedback voltage VFB, an inverting input terminal for receiving a second reference voltage VREF2, and an output terminal outputting a control voltage VCTL. The amplifier 623 may amplify a voltage difference between the feedback voltage VFB and the second reference voltage VREF2 to generate the control voltage VCTL. Since the control voltage VCTL is generated based on the second power voltage ELVSS, the control voltage VCTL may include information on the second power voltage ELVSS. For example, the control voltage VCTL may vary depending on the second power voltage ELVSS.

The digital-to-analog converter 624 may receive a digital code DCODE and generate a code voltage VCODE based on the digital code DCODE. The digital code DCODE may be in a digital form, and the code voltage VCODE may be in an analog form. Therefore, when the digital code DCODE is adjusted, the code voltage VCODE may be adjusted.

The first comparator 625 may include a non-inverting input terminal for receiving the code voltage VCODE, an inverting input terminal for receiving the control voltage VCTL, and an output terminal outputting a first skip signal PSK1. The first comparator 625 may compare the code voltage VCODE with the control voltage VCTL to generate the first skip signal PSK1. For example, when the code voltage VCODE is less than the control voltage VCTL, a first skip signal PSK1 having the low level may be generated. For example, when the code voltage VCODE is greater than or equal to the control voltage VCTL, a first skip signal PSK1 having the high level may be generated.

The second comparator 626 may include a non-inverting input terminal for receiving a sum voltage VSUM, an inverting input terminal for receiving the control voltage VCTL, and an output terminal outputting a second skip signal PSK2. The second comparator 626 may compare the sum voltage VSUM with the control voltage VCTL to generate the second skip signal PSK2. For example, when the sum voltage VSUM is less than the control voltage VCTL, a second skip signal PSK2 having the low level may be generated. For example, when the sum voltage VSUM is greater than or equal to the control voltage VCTL, a second skip signal PSK2 having the high level may be generated. Here, the sum voltage VSUM may include information on the inductor current IL. For example, the sum voltage VSUM may vary depending on the inductor current IL.

The logical sum circuit OLC may receive the first skip signal PSK1 and the second skip signal PSK2, and may perform a logical sum operation on the first skip signal PSK1 and the second skip signal PSK2 to generate a reset signal PWM_RST. For example, when the first skip signal PSK1 has the low level and the second skip signal PSK2 has the low level, the reset signal PWM_RST may have the low level. For example, when the first skip signal PSK1 has the high level and the second skip signal PSK2 has the low level, the reset signal PWM_RST may have the high level. For example, when the first skip signal PSK1 has the low level and the second skip signal PSK2 has the high level, the reset signal PWM_RST may have the high level. For example, when the first skip signal PSK1 has the high level and the second skip signal PSK2 has the high level, the reset signal PWM_RST may have the high level.

The switching controller 627 may include a setting terminal S for receiving a switching control clock signal PWM_CLK, a reset terminal R for receiving the reset signal PWM_RST, and an output terminal Q outputting the switching control signal PWM. In an embodiment, the switching controller 627 may be an SR latch. For example, when the switching control clock signal PWM_CLK has the low level and the reset signal PWM_RST has the low level, the switching control signal PWM may maintain a previous output value. For example, when the switching control clock signal PWM_CLK has the low level and the reset signal PWM_RST has the high level, the switching control signal PWM may have the low level. For example, when the switching control clock signal PWM_CLK has the high level and the reset signal PWM_RST has the low level, the switching control signal PWM may have the high level. That is, the switching control signal PWM may be reset to the low level in response to the reset signal PWM_RST having the high level. In addition, the switching control signal PWM having the high level may be generated in response to the switching control clock signal PWM_CLK having the high level and the reset signal PWM_RST having the low level.

The second converter 620 may further include a first logical product circuit ALC1. The first logical product circuit ALC1 may receive the output signal of the switching controller 627 and a first inverted skip signal PSK1_B, which is an inverted signal of the first skip signal PSK1, and the first logical AND circuit ALC1 may perform a logical product operation on the output signal of the switching controller 627 and the first inverted skip signal PSK1_B and output the result of the logical product operation as the switching control signal PWM. For example, when the output signal of the switching controller 627 has the low level and the first inverted skip signal PSK1_B has the low level, the switching control signal PWM may have the low level. For example, when the output signal of the switching controller 627 has the high level and the first inverted skip signal PSK1_B has the low level, the switching control signal PWM may have the low level. For example, when the output signal of the switching controller 627 has the low level and the first inverted skip signal PSK1_B has the high level, the switching control signal PWM may have the low level. For example, when the output signal of the switching controller 627 has the high level and the first inverted skip signal PSK1_B has the high level, the switching control signal PWM may have the high level. The first logical product circuit ALC1 may mask the switching control signal PWM using the first inverted skip signal PSK1_B. The second converter 620 may further include the first logical product circuit ALC1, such that the same operation performed by the reset signal PWM_RST may be performed once more by the first inverted skip signal PSK1_B.

Figure 8:
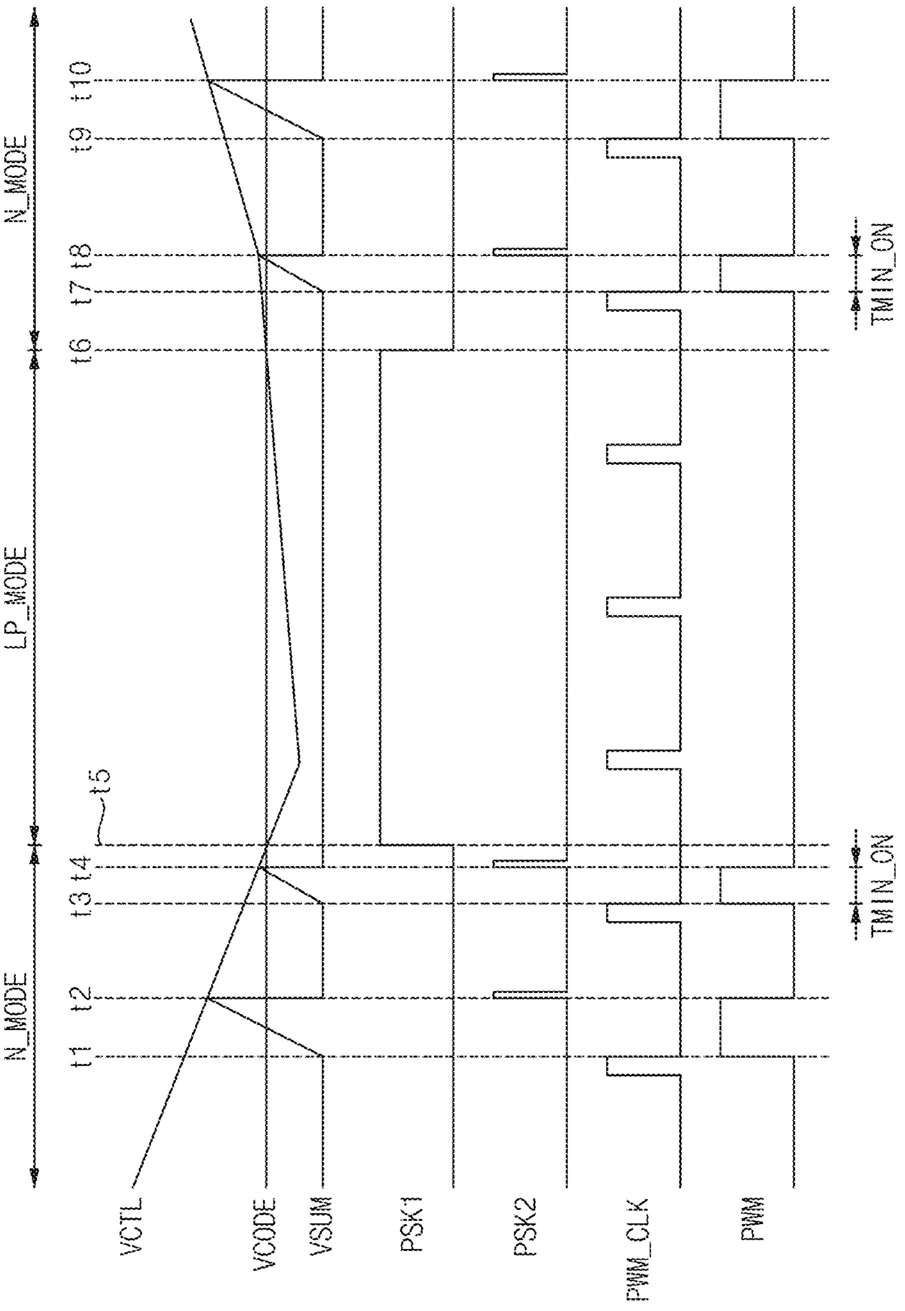
FIG. 8 is a timing diagram illustrating an operation of a second converter of FIG. 7.

FIG. 8 is a timing diagram illustrating an operation of a second converter 620 of FIG. 7.

Referring to FIGS. 1 to 8, immediately before a first time t1, the switching control clock signal PWM_CLK may have the high level and the reset signal PWM_RST may have the low level. (Here, since the code voltage VCODE is less than the control voltage VCTL, the first skip signal PSK1 having the low level may be generated. Since the sum voltage VSUM is less than the control voltage VCTL, a second skip signal PSK2 having the low level may be generated. Since the first skip signal PSK1 and the second skip signal PSK2 have the low level, the reset signal PWM_RST may have the low level.) Therefore, immediately after the first time t1, the switching controller 627 may generate the switching control signal PWM having the high level.

After the first time t1, the switching control clock signal PWM_CLK may have the low level and the reset signal PWM_RST may have the low level. (Here, since the first skip signal PSK1 and the second skip signal PSK2 have the low level, the reset signal PWM_RST may have the low level.) Therefore, after the first time t1, the switching controller 627 may maintain the switching control signal PWM at the high level, which is the previous output value.

The first switching element S1 may be turned on in response to the switching control signal PWM having the high level, and the second switching element S2 may be turned off in response to the switching control signal PWM having the high level. When the first switching element S1 is turned on and the second switching element S2 is turned off, an inductor current IL flowing in the inductor L may be generated, and the electromotive force may be generated in the inductor L by the inductor current IL. Here, the sum voltage VSUM including the information on the inductor current IL may increase over a time, and the control voltage VCTL including the information on the second power voltage ELVSS may decrease over the time.

At a second time t2 after the first time t1, since the code voltage VCODE is less than the control voltage VCTL, the first skip signal PSK1 having the low level may be generated. Since the sum voltage VSUM is greater than or equal to the control voltage VCTL, a second skip signal PSK2 having the high level may be output. Therefore, the reset signal PWM_RST may have the high level. Since the switching control clock signal PWM_CLK has the low level and the reset signal PWM_RST has the high level, the switching controller 627 may generate the switching control signal PWM having the low level.

When the first switching element S1 is turned off and the second switching element S2 is turned on in response to the switching control signal PWM having the low level after the electromotive force is generated in the inductor L, the input voltage VIN may be converted into the second power voltage ELVSS, and the second power voltage ELVSS may be output from the output node ELVSS_ON.

As such, in a time period between the first time t1 and the second time t2, the switching controller 627 may generate a switching control signal PWM having a pulse. In addition, in a time period between a third time t3 and a fourth time t4 after the second time t2, the switching controller 627 may generate a switching control signal PWM having a pulse in the same manner. However, a peak of the sum voltage VSUM may decrease over the time, and the control voltage VCTL may decrease over the time. As a voltage difference between the sum voltage VSUM and the control voltage VCTL decreases, a length of the pulse of the switching control signal PWM may gradually decrease. Here, in the time period between the third time t3 and the fourth time t4, the switching control signal PWM may have a minimum on-time TMIN_ON.

At a fifth time t5 after the fourth time t4, since the code voltage VCODE is greater than or equal to the control voltage VCTL, the first skip signal PSK1 having the high level may be generated. Therefore, the reset signal PWM_RST may have the high level. Since the reset signal PWM_RST has the high level, the switching controller 627 may generate the switching control signal PWM having the low level. The first skip signal PSK1 having the high level may be generated during a time period between the fifth time T5 and the sixth time T6. That is, in the time period between the fifth time t5 and the sixth time t6, the switching of the switching elements S1, S2 may be skipped by the reset signal PWM_RST having the high level, and a power consumption of the second converter 620 may decrease. Accordingly, in a time period before the fifth time t5, the second converter 620 may operate in the normal mode N_MODE, and in the time period between the fifth time t5 and the sixth time t6, the second converter 620 may operate in the low power mode LP_MODE.

In a sixth time t6 after the fifth time t5, since the code voltage VCODE is less than the control voltage VCTL, the first skip signal PSK1 having the low level may be generated. Since the first skip signal PSK1 and the second skip signal PSK2 have the low level, the reset signal PWM_RST may have the low level. The switching controller 627 may maintain the switching control signal PWM at the low level, which is the previous output value.

In a time period between a seventh time t7 and an eighth time t8 after the sixth time t6 and a time period between a ninth time t9 and a tenth time t10, the switching controller 627 may generate a switching control signal PWM having a pulse in the same manner as in the time period between the first time t1 and the second time t2. Therefore, in a time period after the sixth time t6, the second converter 620 may operate in the normal mode N_MODE. Here, the switching control signal PWM may have the minimum on-time TMIN_ON in the time period between the seventh time t7 and the eighth time t8.

A time period during which the second converter 620 operates in the low power mode LP_MODE (i.e., the time period between the fifth time t5 and the sixth time t6) may be determined based on the code voltage VCODE. The minimum on-time TMIN_ON of the switching control signal PWM may be determined based on the time period of the low power mode LP_MODE. The threshold current ITH may be determined based on an area of the inductor current IL at the minimum on-time TMIN_ON of the switching control signal PWM.

As such, the minimum on-time TMIN_ON of the switching control signal PWM may be determined based on the code voltage VCODE, the threshold current ITH may be determined based on the minimum on-time TMIN_ON of the switching control signal PWM, and the power consumption of the second converter 620 may be determined based on the threshold current ITH.

The code voltage VCODE may be adjusted based on the digital code DCODE.

Figure 9:
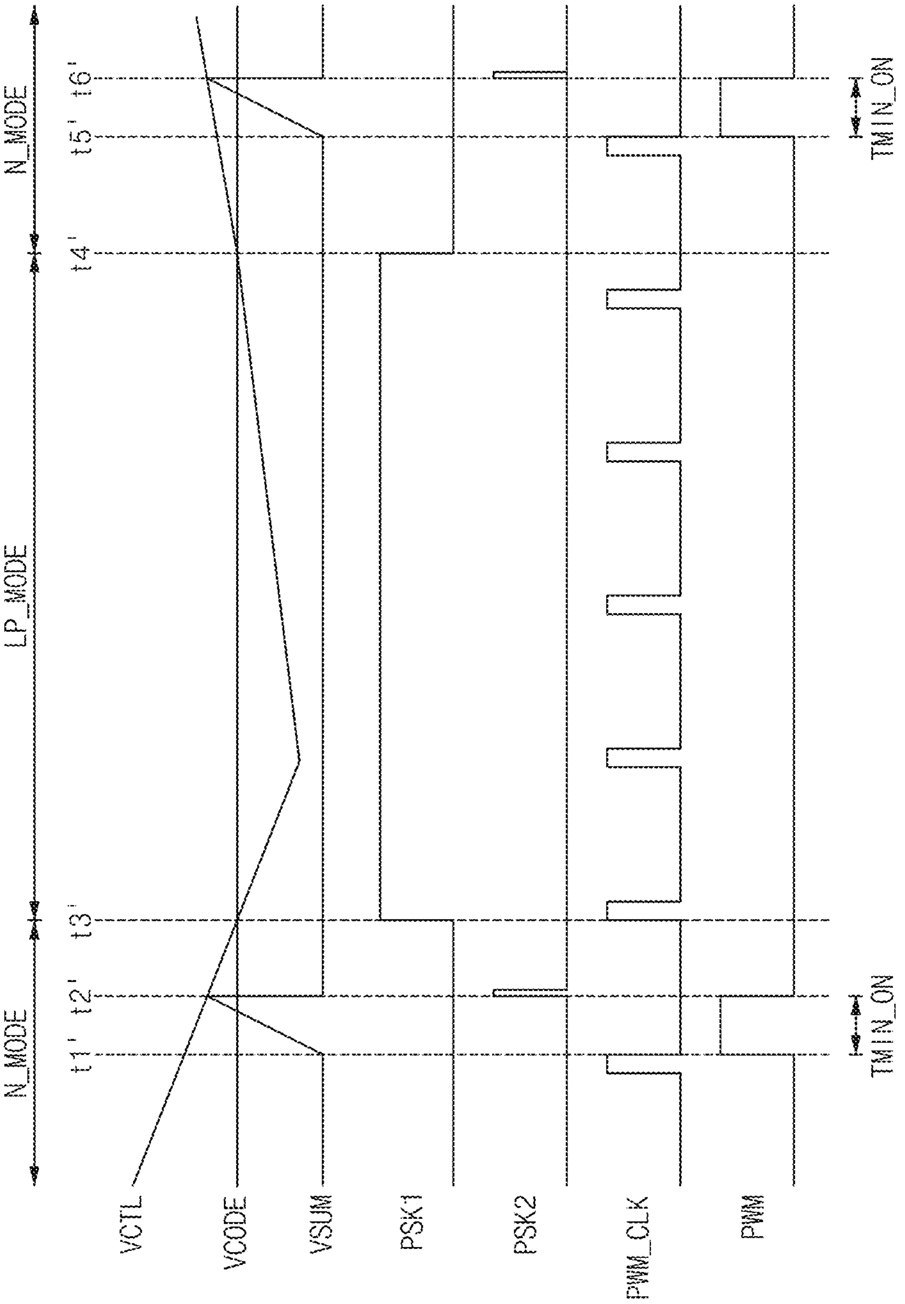
FIG. 9 is a timing diagram illustrating an operation of a second converter of FIG. 7.

FIG. 9 is a timing diagram illustrating an operation of a second converter 620 of FIG. 7 according to another embodiment. FIG. 10 is a table illustrating a threshold current ITH depending on a digital code DCODE.

Referring to FIGS. 1 to 10, as described above, the code voltage VCODE may be adjusted based on the digital code DCODE, the minimum on-time TMIN_ON of the switching control signal PWM may be determined based on the code voltage VCODE, the threshold current ITH may be determined based on the minimum on-time TMIN_ON of the switching control signal PWM, and the power consumption of the second converter 620 may be determined based on the threshold current ITH.

The code voltage VCODE may be changed from the code voltage VCODE of FIG. 8 to the code voltage VCODE of FIG. 9. The code voltage VCODE of FIG. 9 may be greater than the code voltage VCODE of FIG. 8. As the code voltage VCODE changes, a time point at which the control voltage VCTL and the code voltage VCODE become equal may change to a third time t3' and a fourth time t4'. Therefore, the time period of the low power mode LP_MODE may be lengthened, and the skipped switching of the switching elements S1, S2 may increase.

In a time period between the first time t1' and the second time t2', the switching control signal PWM may have the minimum on-time TMIN_ON. In addition, in a time period between the fifth time t5' and the sixth time t6', the switching control signal PWM may have the minimum on-time TMIN_ON. When the code voltage VCODE increases, the minimum on-time TMIN_ON of the switching control signal PWM may increase, and the area of the inductor current IL may increase at the minimum on-time TMIN_ON of the switching control signal PWM, and accordingly, the threshold current ITH may increase.

In a time period before the third time t3', the second converter 620 may operate in the normal mode N_MODE. In the time period between the third time t3' and the fourth time t4', the second converter 620 may operate in the low power mode LP_MODE. In a time period after the fourth time t4', the second converter 620 may operate in the normal mode N_MODE.

As such, when the code voltage VCODE is adjusted, the switching control signal PWM may be adjusted and the threshold current ITH may be adjusted. Accordingly, the power consumption of the second converter 620 may be adjusted.

FIG. 10 shows a table organizing the code voltage VCODE, the minimum on-time TMIN_ON of the switching control signal PWM, and the threshold current ITH depending on the digital code DCODE based on the described content.

Figure 11A:
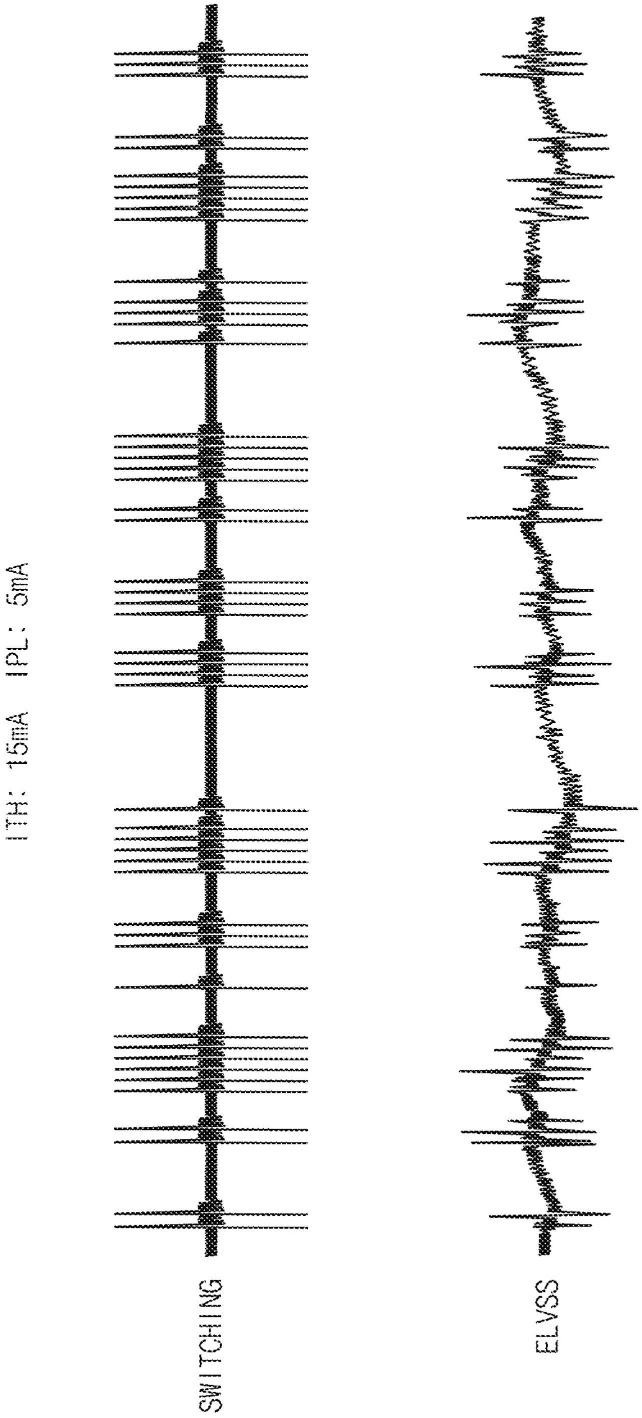
FIGS. 11A to 11C are graphs illustrating a switching of switching elements and a second power voltage depending on a load at a threshold current of 15 mA.
Figure 11B:
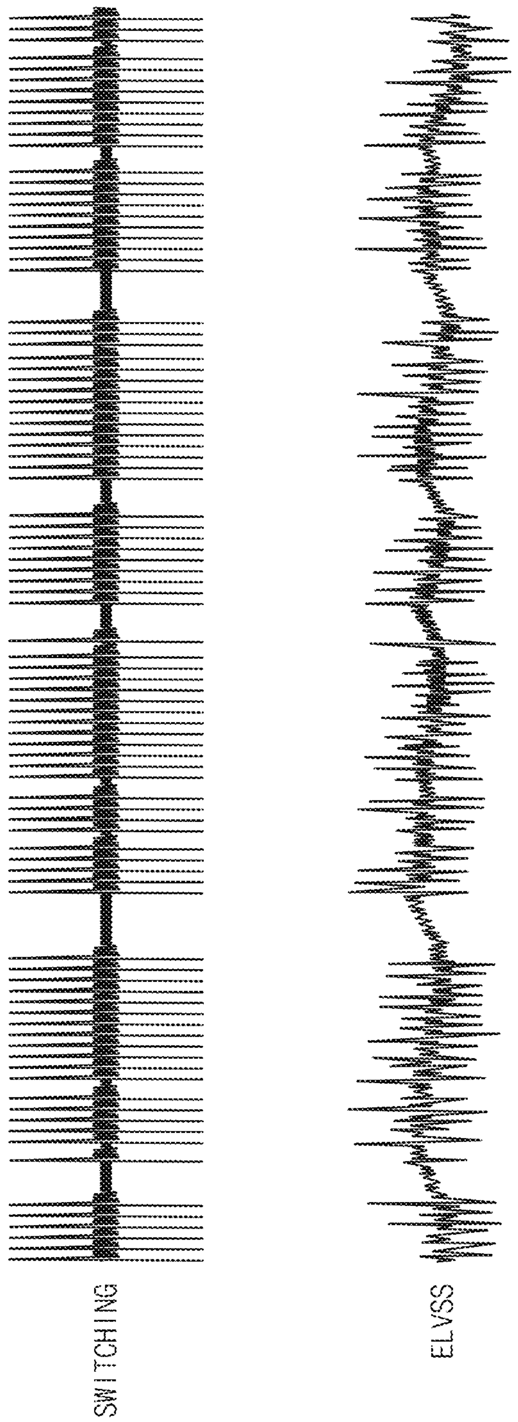
Figure 11C:
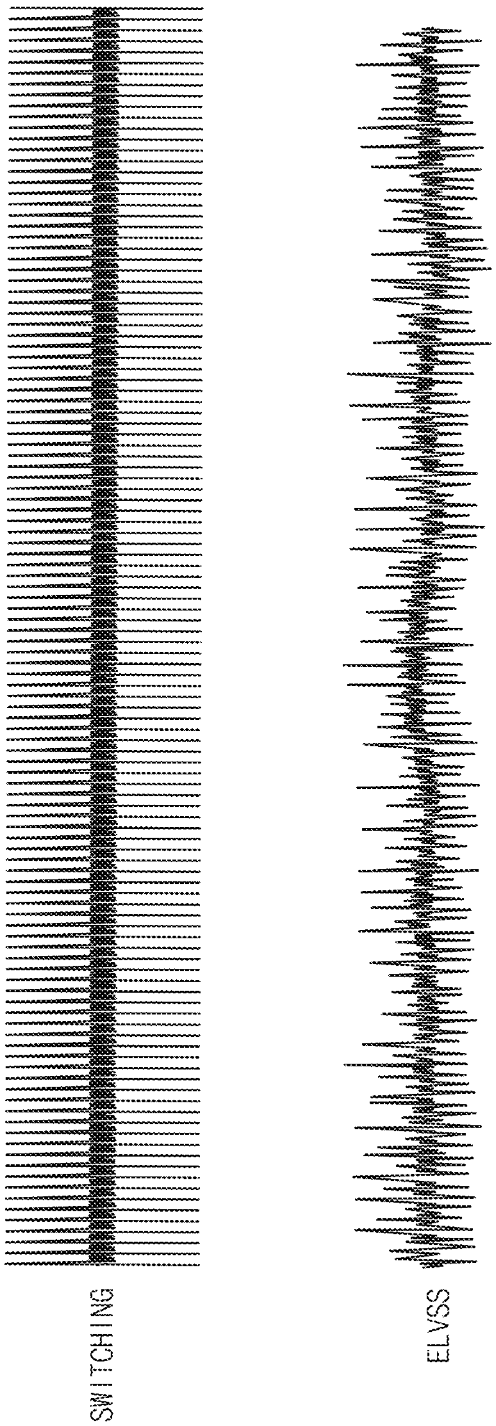

FIGS. 11A to 11C are graphs illustrating a switching of switching elements S1, S2 and a second power voltage ELVSS depending on a load IPL at a threshold current ITH of 15 mA. FIGS. 12A to 12D are graphs illustrating a switching of switching elements S1, S2 and a second power voltage ELVSS depending on a load IPL at a threshold current ITH of 20 mA.

Referring to FIGS. 1 to 12D, since the switching of the switching elements S1, S2 included in the second converter 620 varies depending on the load IPL and the threshold current ITH, a ripple of the second power voltage ELVSS may vary depending on the load IPL and the threshold current ITH.

FIGS. 11A to 11C show the ripple of the second power voltage ELVSS depending on the load IPL when the threshold current ITH is 15 mA.

As shown in FIG. 11A, when the threshold current ITH is 15 mA and the load IPL is 5 mA, the second converter 620 may operate in the low power mode LP_MODE, and in the low power mode LP_MODE, the switching of the switching elements S1, S2 included in the second converter 620 may be skipped, such that the ripple of the second power voltage ELVSS may be generated. While the switching of the switching elements S1, S2 is skipped, the second power voltage ELVSS may increase. On the other hand, while the switching of the switching elements is not skipped, the second power voltage ELVSS may decrease. The increase or decrease of the second power voltage ELVSS may indicate the ripple of the second power voltage ELVSS. However, since the skipped switching is large, the ripple of the second power voltage ELVSS may be large.

As shown in FIG. 11*b*, when the threshold current ITH is 15 mA and the load IPL is 10 mA, the second converter 620 may operate in the low power mode LP_MODE, and in the low power mode LP_MODE, the switching of the switching elements S1, S2 included in the second converter 620 is skipped, such that the ripple of the second power voltage ELVSS may be generated. However, since the skipped switching is small, the ripple of the second power voltage ELVSS may be small.

As shown in FIG. 11*c*, when the threshold current ITH is 15 mA and the load IPL is 15 mA, the second converter 620 may operate in the normal mode N_MODE, and in the normal mode N_MODE, the switching of the switching elements S1, S2 included in the second converter 620 is not skipped, such that the ripple of the second power voltage ELVSS may not be generated.

FIGS. 12*a* to 12*d* show the ripple of the second power voltage ELVSS depending on the load IPL when the threshold current ITH is 20 mA.

Figure 12A:
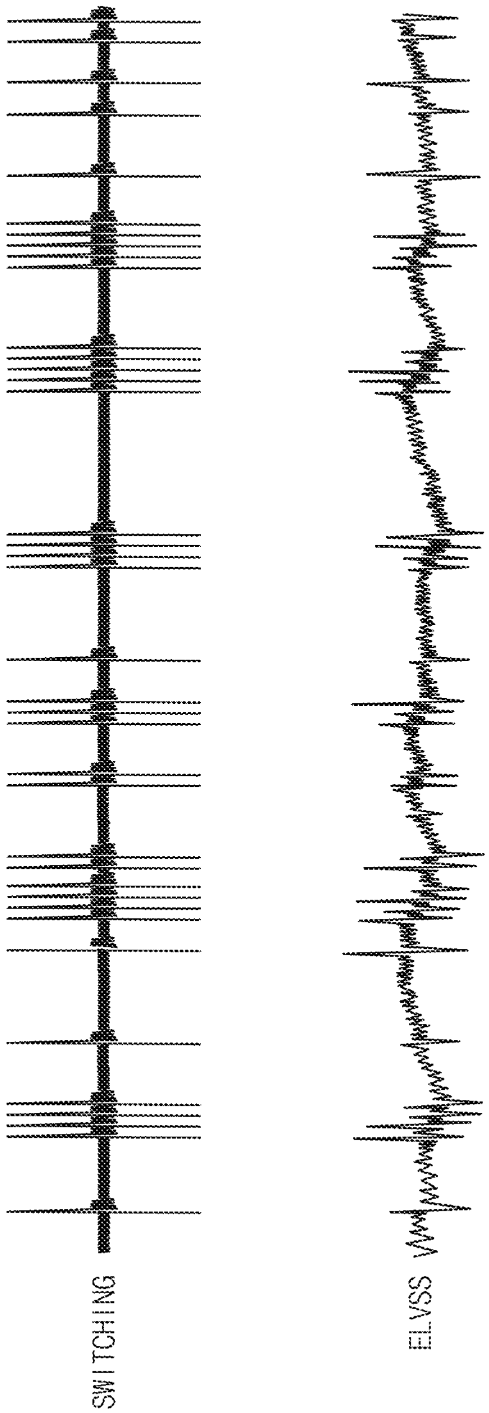
FIGS. 12A to 12D are graphs illustrating a switching of switching elements and a second power voltage depending on a load at a threshold current of 20 mA.

As shown in FIG. 12*a*, when the threshold current ITH is 20 mA and the load IPL is 5 mA, the second converter 620 may operate in the low power mode LP_MODE, and in the low power mode LP_MODE, the switching of the switching elements S1, S2 included in the second converter 620 may be skipped, such that the ripple of the second power voltage ELVSS may be generated. However, since the skipped switching is large, the ripple of the second power voltage ELVSS may be large.

Figure 12B:
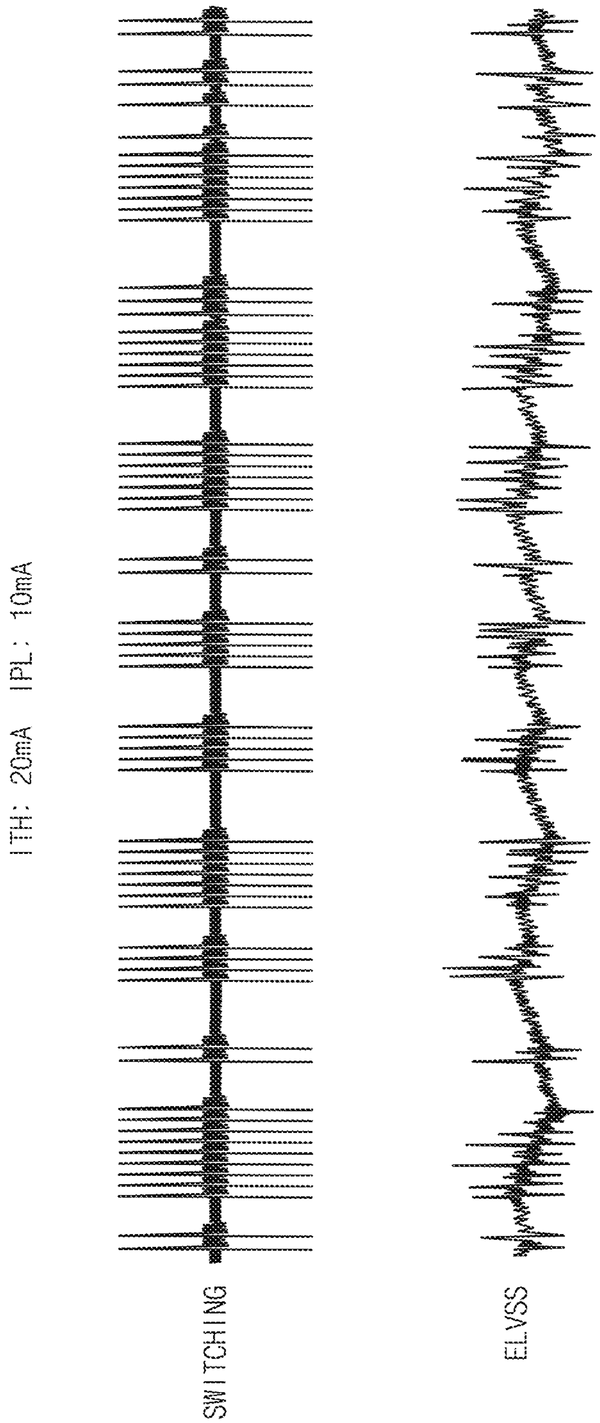

As shown in FIG. 12*b*, when the threshold current ITH is 20 mA and the load IPL is 10 mA, the second converter 620 may operate in the low power mode LP_MODE, and in the low power mode LP_MODE, the switching of the switching elements S1, S2 included in the second converter 620 may be skipped, such that the ripple of the second power voltage ELVSS may be generated. However, since the skipped switching is less at the load IPL of 10 mA than at the load IPL of 5 mA, the ripple of the second power voltage ELVSS may be less at the load IPL of 10 mA than at the load IPL of 5 mA.

Figure 12C:
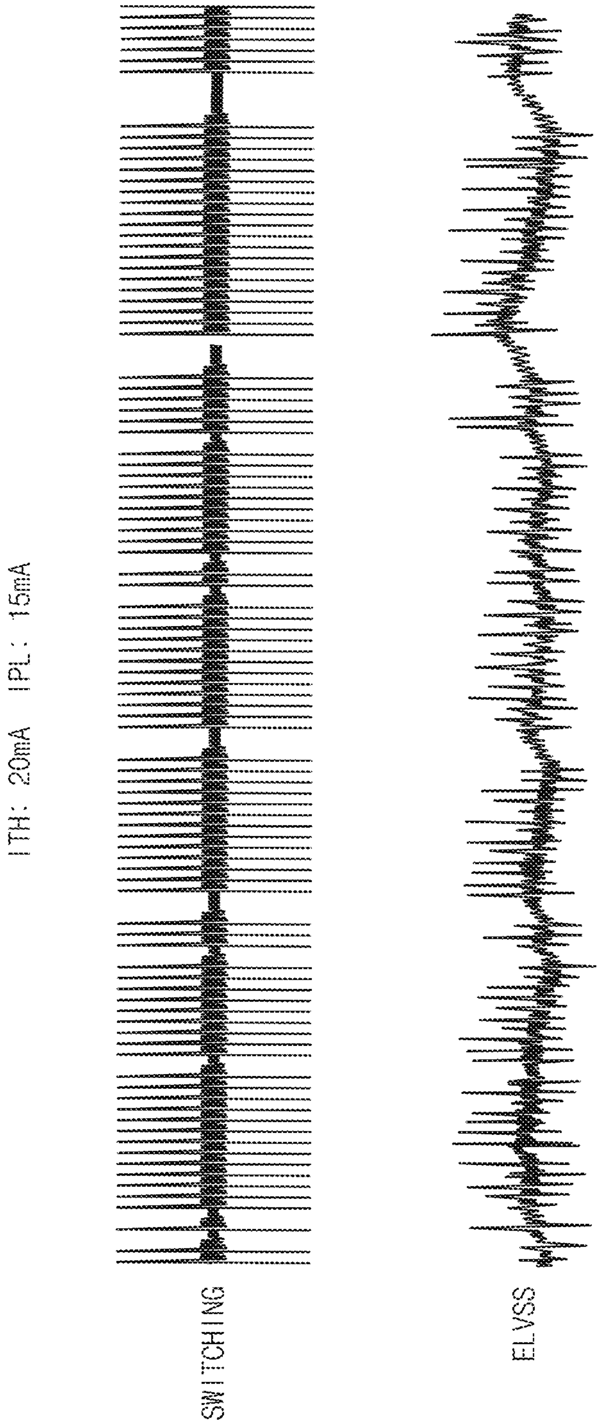

As shown in FIG. 12*c*, when the threshold current ITH is 20 mA and the load IPL is 15 mA, the second converter 620 may operate in the low power mode LP_MODE, and in the low power mode LP_MODE, the switching of the switching elements S1, S2 included in the second converter 620 may be skipped, such that the ripple of the second power voltage ELVSS may be generated. However, since the skipped switching is less at the load IPL of 15 mA than at the load IPL of 10 mA, the ripple of the second power voltage ELVSS may be less at the load IPL of 15 mA than at the load IPL of 10 mA.

Figure 12D:
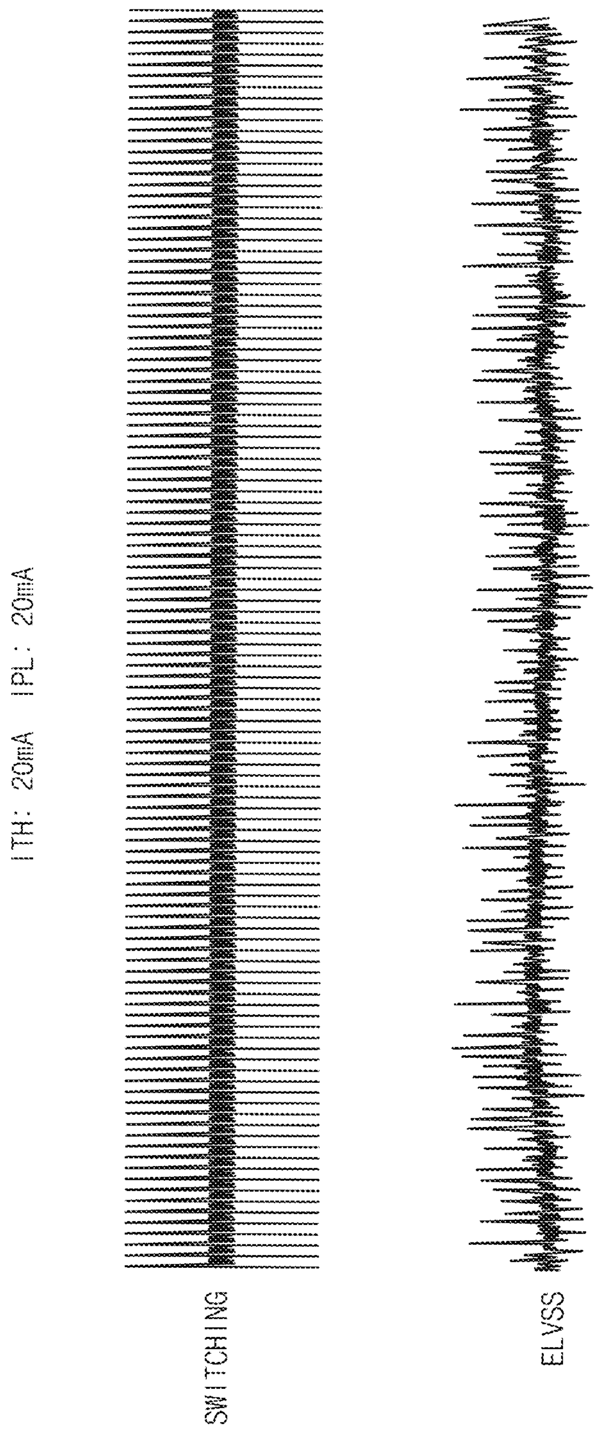

As shown in to FIG. 12*d*, when the threshold current ITH is 20 mA and the load IPL is 20 mA, the second converter 620 may operate in the normal mode N_MODE, and in the normal mode N_MODE, the switching of the switching elements included in the second converter 620 may not skipped, such that the ripple of the second power voltage ELVSS may not be generated.

FIG. 8 may correspond to a threshold current ITH of 15 mA, and FIG. 9 may correspond to a threshold current ITH of 20 mA. When comparing FIG. 11*a* and FIG. 12*a*, where the load IPL is equal to 5 mA, when the threshold current ITH increases, the skipped switching may increase. Therefore, the ripple of the second power voltage ELVSS may increase.

As such, when the second converter 620 operates in the low power mode LP_MODE and the threshold current ITH increases, the skipped switching of the switching elements S1, S2 included in the second converter 620 increases, such that the ripple of the second power voltage ELVSS may increase, and a luminance of the image may fluctuate. Accordingly, a flicker may be generated in the image, and a display quality of the display device 10 may decrease.

In summary, when the threshold current ITH is large, a power consumption of the second converter 620 may decrease, and a generation possibility of the flicker may increase. On the other hand, when the threshold current ITH is small, the power consumption of the second converter 620 may increase, and the generation possibility of the flicker may decrease. In addition, since a size of the display panel 100 varies depending on an electronic device, and the threshold current ITH affecting the display quality of the display panel 100 varies depending on the size of the display panel 100, it may be important to adjust the threshold current ITH such that the flicker does not be generated depending on the electronic device.

As such, in the second converter 620 according to an embodiment of the present invention, when the code voltage VCODE is adjusted, the switching control signal PWM may be adjusted, and the threshold current ITH may be adjusted. Accordingly, the threshold current ITH may be adjusted such that the flicker is effectively prevented in the image while the power consumption of the second converter 620 decreases.

Figure 13:
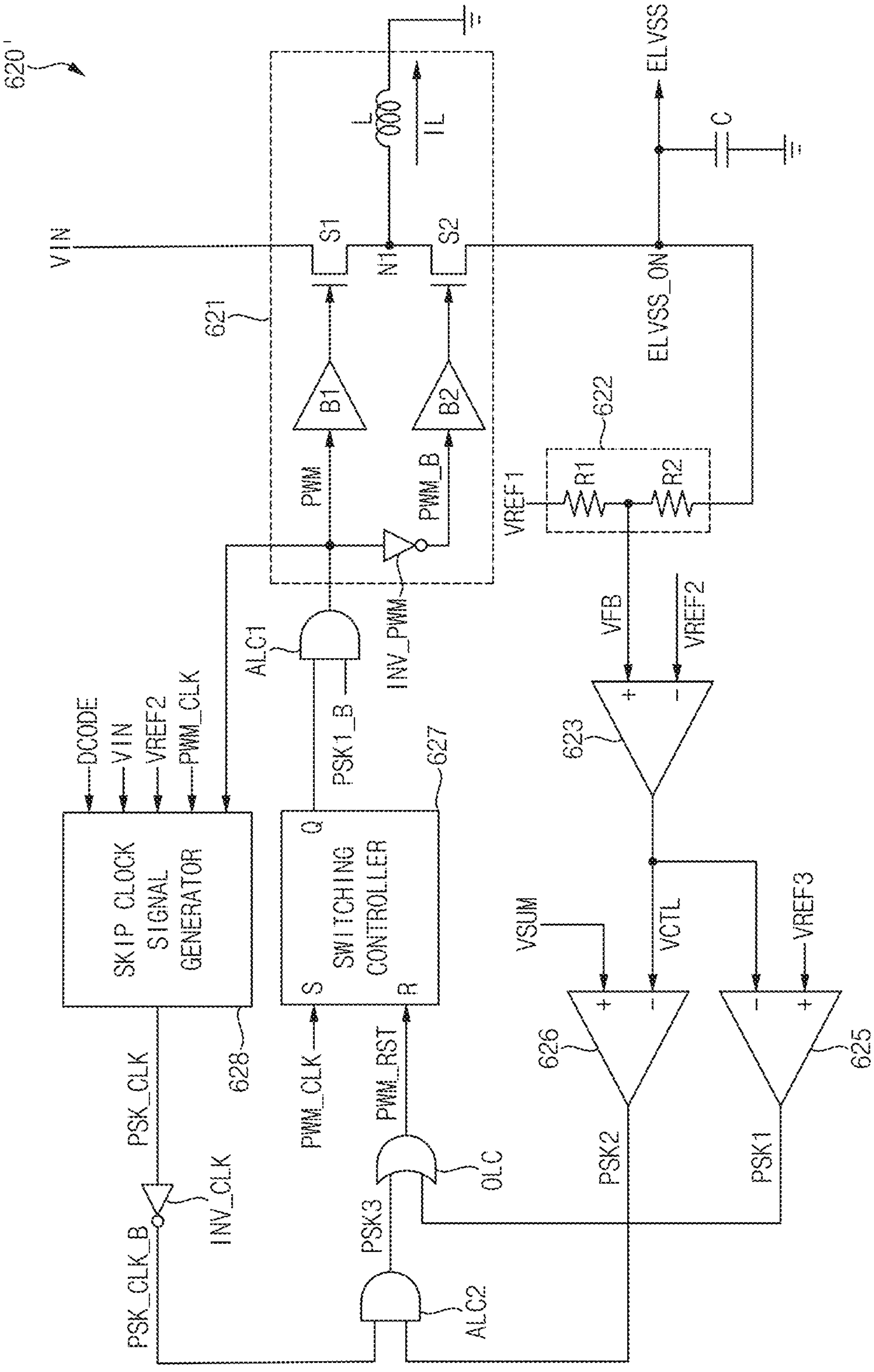
FIG. 13 is a block diagram illustrating a second converter according to an embodiment of the present invention.

FIG. 13 is a block diagram illustrating a second converter 620' according to an embodiment of the present invention.

Referring to FIGS. 1 to 6 and 13, a second converter 620' may receive an input voltage VIN and generate a second power voltage ELVSS using the input voltage VIN. The second converter 620 may operate in a low power mode LP_MODE or a normal mode N_MODE depending on a load IPL based on a threshold current ITH.

The second converter 620 may include a switcher 621, a feedback voltage generator 622, an amplifier 623, a first comparator 625, a second comparator 626, a switching controller 627, a skip clock signal generator 628, a logical sum circuit OLC, a clock inverter INV_CLK, a second logical product circuit ALC2, and a capacitor C.

The switcher 621 may receive a switching control signal PWM and the input voltage VIN. The switcher 621 may include a first switching element S1, a second switching element S2 connected to the first switching element S1, an inductor L connected to the first switching element S1 and the second switching element S2, and a switching inverter INV_PWM connected to the second switching element S2.

The first switching element S1 may include a gate terminal for receiving the switching control signal PWM, a first terminal for receiving the input voltage VIN, and a second terminal connected to a first node N1. The switching inverter INV_PWM may invert the switching control signal PWM to generate an inverted switching control signal PWM_B. The second switching element S2 may include a gate terminal for receiving the inverted switching control signal PWM_B, a first terminal connected to the first node N1, and a second terminal connected to an output node ELVSS_ON. The inductor L may include a first terminal connected to the first node N1 and a second terminal connected to ground. Here, the switching control signal PWM may be a Pulse Width Modulation (PWM) signal. Therefore, a pulse width of the switching control signal PWM and a pulse width of the inverted switching control signal PWM_B may be modulated.

The switcher 621 may further include a first buffer B1 transmitting the switching control signal PWM to the first switching element S1 and a second buffer B2 transmitting the inverted switching control signal PWM_B to the second switching element S2.

As shown in FIG. 13, the first switching element S1 and the second switching element S2 are shown as N-type transistors, but the present invention is not limited thereto.

The first switching element S1 and the second switching element S2 may be P-type transistors in another embodiment.

The first switching element S1 may be turned on in response to a switching control signal PWM having an on-duty (i.e., a high level), and the second switching element S2 may be turned on in response to a switching control signal PWM having an off-duty (i.e., a low level). When the first switching element S1 is turned on and the second switching element S2 is turned off, an inductor current IL flowing in the inductor L may be generated, and an electromotive force may be generated in the inductor L by the inductor current IL. When the first switching element S1 is turned off and the second switching element S2 is turned on in response to the switching control signal PWM having the low level after the electromotive force is generated in the inductor L, the input voltage VIN may be converted into the second power voltage ELVSS, and the second power voltage ELVSS may be output from the output node ELVSS_ON. Here, the capacitor C may be connected to the output node ELVSS_ON.

The feedback voltage generator 622 may include a first resistor R1 and a second resistor R2. One terminal of the first resistor R1 and one terminal of the second resistor R2 may be connected to each other, the other terminal of the first resistor R1 may receive a first reference voltage VREF1, and the other terminal of the second resistor R2 may be connected to the output node ELVSS_ON to receive the second power voltage ELVSS. Therefore, the feedback voltage generator 622 may generate a voltage between the first reference voltage VREF1 and the second power voltage ELVSS as a feedback voltage VFB.

The amplifier 623 may include a non-inverting input terminal for receiving the feedback voltage VFB, an inverting input terminal for receiving a second reference voltage VREF2, and an output terminal outputting a control voltage VCTL. The amplifier 623 may amplify a voltage difference between the feedback voltage VFB and the second reference voltage VREF2 to generate the control voltage VCTL. Since the control voltage VCTL is generated based on the second power voltage ELVSS, the control voltage VCTL may include information on the second power voltage ELVSS. For example, the control voltage VCTL may vary depending on the second power voltage ELVSS.

The first comparator 625 may include a non-inverting input terminal for receiving a third reference voltage VREF3, an inverting input terminal for receiving the control voltage VCTL, and an output terminal outputting a first skip signal PSK1. The first comparator 625 may compare the third reference voltage VREF3 and the control voltage VCTL to generate the first skip signal PSK1. For example, when the third reference voltage VREF3 is less than the control voltage VCTL, the first skip signal PSK1 having the low level may be generated. For example, when the third reference voltage VREF3 is greater than or equal to the control voltage VCTL, a first skip signal PSK1 having the high level may be generated.

The second comparator 626 may include a non-inverting input terminal for receiving a sum voltage VSUM, an inverting input terminal for receiving the control voltage VCTL, and an output terminal outputting a second skip signal PSK2. The second comparator 626 may compare the sum voltage VSUM with the control voltage VCTL to generate the second skip signal PSK2. For example, when the sum voltage VSUM is less than the control voltage VCTL, a second skip signal PSK2 having the low level may be generated. For example, when the sum voltage VSUM is greater than or equal to the control voltage VCTL, a second skip signal PSK2 having the high level may be generated. Here, the sum voltage VSUM may include information on the inductor current IL. For example, the sum voltage VSUM may vary depending on the inductor current IL.

The skip clock signal generator 628 may receive a digital code DCODE, the input voltage VIN, the second reference voltage VREF2, a switching control clock signal PWM_CLK, and the switching control signal PWM, and may generate a skip clock signal PSK_CLK based on the digital code DCODE, the input voltage VIN, the second reference voltage VREF2, the switching control clock signal PWM_CLK, and the switching control signal PWM. For example, when the switching control clock signal PWM_CLK rises from the low level to the high level, the skip clock signal PSK_CLK may rise from the low level to the high level. For example, a time period during which the skip clock signal PSK_CLK has the high level may be determined based on the digital code DCODE. In addition, the time period during which the skip clock signal PSK_CLK has the high level may be determined based on the digital code DCODE, but the switching control signal PWM may also be additionally referred to.

The clock inverter INV_CLK may invert the skip clock signal PSK_CLK to generate an inverted skip clock signal PSK_CLK_B.

The second logical product circuit ALC2 may receive the second skip signal PSK2 and the inverted skip clock signal PSK_CLK_B, and the second product circuit ALC2 may perform a logical product operation on the second skip signal PSK2 and the inverted skip clock signal PSK_CLK_B to generate a third skip signal PSK3. For example, when the second skip signal PSK2 has the low level and the inverted skip clock signal PSK_CLK_B has the low level, the third skip signal PSK3 may have the low level. For example, when the second skip signal PSK2 has the high level and the inverted skip clock signal PSK_CLK_B has the low level, the third skip signal PSK3 may have the low level. For example, when the second skip signal PSK2 has the low level and the inverted skip clock signal PSK_CLK_B has the high level, the third skip signal PSK3 may have the low level. For example, when the second skip signal PSK2 has the high level and the inverted skip clock signal PSK_CLK_B has the high level, the third skip signal PSK3 may have the high level.

The logical product circuit OLC may receive the first skip signal PSK1 and the third skip signal PSK3, and may perform a logical sum operation on the first skip signal PSK1 and the third skip signal PSK3 to generate a reset signal PWM_RST. For example, when the first skip signal PSK1 has the low level and the third skip signal PSK3 has the low level, the reset signal PWM_RST may have the low level. For example, when the first skip signal PSK1 has the high level and the third skip signal PSK3 has the low level, the reset signal PWM_RST may have the high level. For example, when the first skip signal PSK1 has the low level and the third skip signal PSK3 has the high level, the reset signal PWM_RST may have the high level. For example, when the first skip signal PSK1 has the high level and the third skip signal PSK3 has the high level, the reset signal PWM_RST may have the high level.

The switching controller 627 may include a setting terminal S for receiving a switching control clock signal PWM_CLK, a reset terminal R for receiving the reset signal PWM_RST, and an output terminal Q outputting the switching control signal PWM. In an embodiment, the switching controller 627 may be an SR latch. For example, when the switching control clock signal PWM_CLK has the low level and the reset signal PWM_RST has the low level, the switching control signal PWM may maintain a previous output value. For example, when the switching control clock signal PWM_CLK has the low level and the reset signal PWM_RST has the high level, the switching control signal PWM may have the low level. For example, when the switching control clock signal PWM_CLK has the high level and the reset signal PWM_RST has the low level, the switching control signal PWM may have the high level. That is, the switching control signal PWM may be reset to the low level in response to the reset signal PWM_RST having the high level. In addition, the switching control signal PWM having the high level may be generated in response to the switching control clock signal PWM_CLK having the high level and the reset signal PWM_RST having the low level.

The second converter 620' may further include the first logical product circuit ALC1. The first logical product circuit ALC1 may receive the output signal of the switching controller 627 and a first inverted skip signal PSK1_B, which is an inverted signal of the first skip signal PSK1, and the first logical product circuit ALC1 may perform a logical product operation on the output signal of the switching controller 627 and the first inverted skip signal PSK1_B and output the result of the logical product operation as the switching control signal PWM. For example, when the output signal of the switching controller 627 has the low level and the first inverted skip signal PSK1_B has the low level, the switching control signal PWM may have the low level. For example, when the output signal of the switching controller 627 has the high level and the first inverted skip signal PSK1_B has the low level, the switching control signal PWM may have the low level. For example, when the output signal of the switching controller 627 has the low level and the first inverted skip signal PSK1_B has the high level, the switching control signal PWM may have the low level. For example, when the output signal of the switching controller 627 has the high level and the first inverted skip signal PSK1_B has the high level, the switching control signal PWM may have the high level. The first logical product circuit ALC1 may mask the switching control signal PWM using the first inverted skip signal PSK1_B. The second converter 620' may further includes the first logical product circuit ALC1, such that the same operation as an operation performed by the reset signal PWM_RST may be performed once more by the first inverted skip signal PSK1_B.

Figure 14:
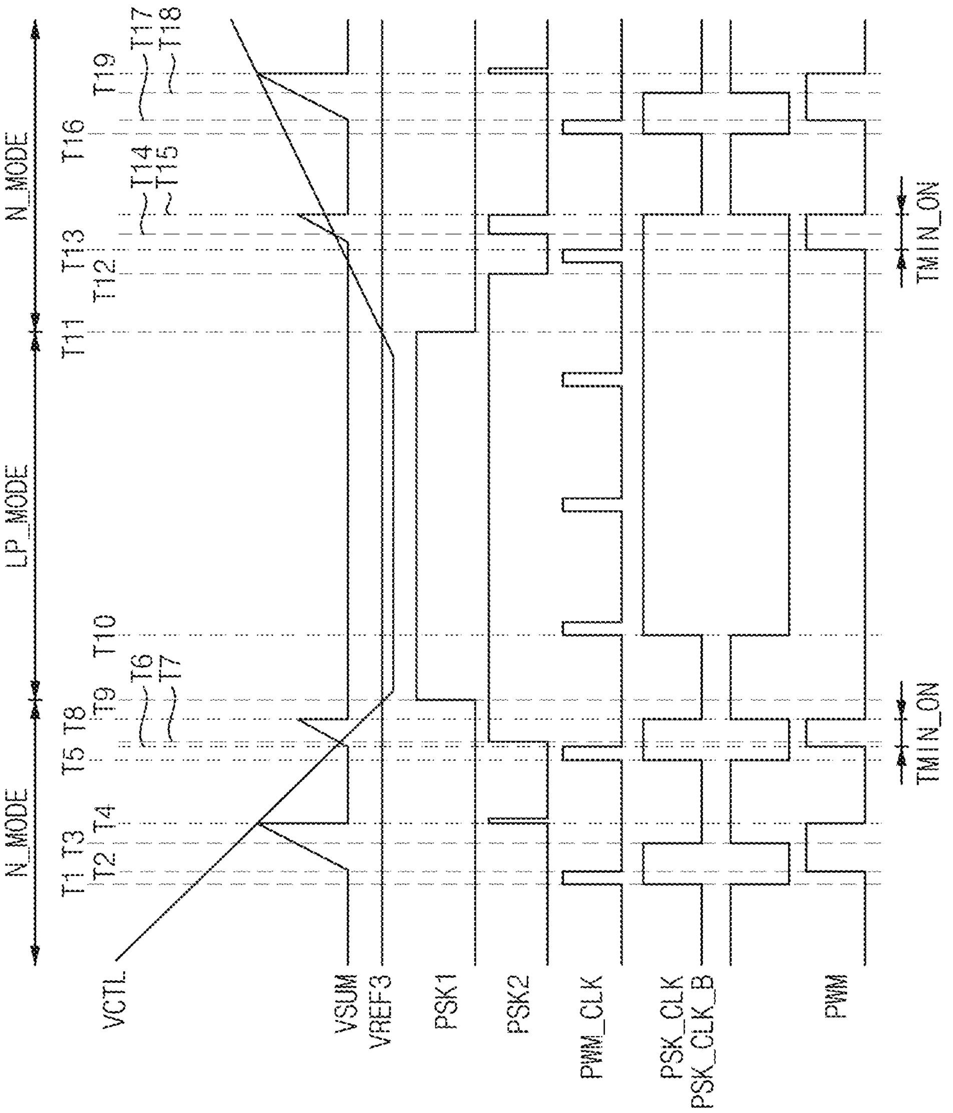
FIG. 14 is a timing diagram illustrating an operation of a second converter of FIG. 13.

FIG. 14 is a timing diagram illustrating an operation of a second converter 620' of FIG. 13.

Referring to FIGS. 1 to 6, FIG. 13, and FIG. 14, at a first time T1, the switching control clock signal PWM_CLK may rise from the low level to the high level, and the skip clock signal generator 628 may generate a skip clock signal PSK_CLK having the high level in response to the rising switching control clock signal PWM_CLK. The clock inverter INV_CLK may invert the skip clock signal PSK_CLK having the high level to generate an inverted skip clock signal PSK_CLK_B having the low level.

Immediately before a second time T2, the switching control clock signal PWM_CLK may have the high level and the reset signal PWM_RST may have the low level. (Here, since the third reference voltage VREF3 is less than the control voltage VCTL, the first skip signal PSK1 having the low level may be generated. Since the sum voltage VSUM is lower than the control voltage VCTL, the second skip signal PSK2 having the low level may be generated. Since the second skip signal PSK2 has the low level and the inverted skip clock signal PSK_CLK_B has the low level, the third skip signal PSK3 may have the low level. Since the first skip signal PSK1 and the third skip signal PSK3 have the low level, the reset signal PWM_RST may have the low level.) Therefore, immediately after the second time T2, the switching controller 627 may generate the switching control signal PWM having the high level.

After the second time T2, the switching control clock signal PWM_CLK may have the low level and the reset signal PWM_RST may have the low level. (Here, since the first skip signal PSK1, the second skip signal PSK2, and the inverted skip clock signal PSK_CLK_B have the low level, the reset signal PWM_RST may have the low level.) Therefore, after the second time T2, the switching controller 627 may maintain the switching control signal PWM at the high level, which is the previous output value.

The first switching element S1 may be turned on in response to the switching control signal PWM having the high level, and the second switching element S2 may be turned off in response to the switching control signal PWM having the high level. When the first switching element S1 is turned on and the second switching element S2 is turned off, an inductor current IL flowing in the inductor L may be generated, and the electromotive force may be generated in the inductor L by the inductor current IL. Here, the sum voltage VSUM including the information on the inductor current IL may increase over a time, and the control voltage VCTL including the information on the second power voltage ELVSS may decrease over the time.

At a third time T3 after the second time T2, the skip clock signal generator 628 may determine the time period in which the skip clock signal PSK_CLK has the high level based on the digital code DCODE. Therefore, the skip clock signal generator 628 may generate the skip clock signal PSK_CLK having the low level. The clock inverter INV_CLK may invert the skip clock signal PSK_CLK having the low level to generate the inverted skip clock signal PSK_CLK_B having the high level.

At a fourth time T4 after the third time T3, since the third reference voltage VREF3 is less than the control voltage VCTL, the first skip signal PSK1 having the low level may be generated. Since the sum voltage VSUM is greater than or equal to the control voltage VCTL, the second skip signal PSK2 having the high level may be generated. Since the second skip signal PSK2 has the high level and the inverted skip clock signal PSK_CLK_B has the high signal, the third skip signal PSK3 may have the low level. Since the first skip signal PSK1 has the low level and the third skip signal PSK3 has the high level, the reset signal PWM_RST may have the high level. Since the switching control clock signal PWM_CLK has the low level and the reset signal PWM_RST has the high level, the switching control signal PWM may have the low level.

At a fifth time T5 after the fourth time T4, the skip clock signal PSK_CLK having the high level and the inverted skip clock signal PSK_CLK_B having the low level may be generated in the same manner as at the first time T1.

At a sixth time T6 after the fifth time T5, the switching control signal PWM having the high level may be generated in the same manner as at the second time T2.

At a seventh time T7 after the sixth time T6, since the third reference voltage VREF3 is less than the control voltage VCTL, the first skip signal PSK1 having the low level may be generated. Since the sum voltage VSUM is greater than or equal to the control voltage VCTL, the second skip signal PSK2 may have the high level. Since the second skip signal PSK2 has the high level and the inverted skip clock signal PSK_CLK_B has the low signal, the third skip signal PSK3 may have the low level. Since the first skip signal PSK1 and the third skip signal PSK3 have the low level, the reset signal PWM_RST may have the low level. Since the switching control clock signal PWM_CLK and the reset signal PWM_RST have the low level, the switching control signal PWM may be maintained at the high level, which is the previous output value.

At an eighth time T8 after the seventh time T7, the skip clock signal PSK_CLK having the low level and the inverted skip clock signal PSK_CLK_B having the high level may be generated in the same manner as at the fourth time T4. Since the third reference voltage VREF3 is less than the control voltage VCTL, the first skip signal PSK1 having the low level may be generated. Since the sum voltage VSUM is greater than or equal to the control voltage VCTL, the second skip signal PSK2 may have the high level. Since the second skip signal PSK2 has the high level and the inverted skip clock signal PSK_CLK_B has the high level, the third skip signal PSK3 may have the high level. Since the first skip signal PSK1 has the low level and the third skip signal PSK3 has the high level, the reset signal PWM_RST may have the high level. Since the switching control clock signal PWM_CLK has the low level and the reset signal PWM_RST has the high level, the switching control signal PWM may have the low level. Here, the switching control signal PWM may have the minimum on-time TMIN_ON in the time period between the sixth time T6 and the eighth time T8.

As such, at the seventh time T7, the second skip signal PSK2 having the high level may be masked by the inverted skip clock signal PSK_CLK_B having the low level, such that the minimum on-time TMIN_ON may not decrease.

At a ninth time T9 after the eighth time T8, when the third reference voltage VREF3 is greater than or equal to the control voltage VCTL, a first skip signal PSK1 having the high level may be generated. The first skip signal PSK1 having the high level may be generated during a time period between the ninth time T9 and the eleventh time T11. Since the sum voltage VSUM is greater than or equal to the control voltage VCTL, the second skip signal PSK2 may have the high level. Since the second skip signal PSK2 has the high level and the inverted skip clock signal PSK_CLK_B has the high signal, the third skip signal PSK3 may have the high level. Since the first skip signal PSK1 has the low level and the third skip signal PSK3 has the high level, the reset signal PWM_RST may have the high level. Since the switching control clock signal PWM_CLK has the low level and the reset signal PWM_RST has the high level, the switching control signal PWM may have the low level. That is, the switching of the switching elements S1, S2 may be skipped by the reset signal PWM_RST having the high level in the time period between the ninth time T9 and the eleventh time T11, and a power consumption of the second converter 620' may decrease. Accordingly, in a time period before the ninth time T9, the second converter 620 may operate in the normal mode N_MODE, and in the time period between the ninth time T9 and the eleventh time T11, the second converter 620 may operate in the low power mode LP_MODE.

In a tenth time T10 after the ninth time T9, the skip clock signal PSK_CLK having the high level and the inverted skip clock signal PSK_CLK_B having the low level may be generated in the same manner as in the first time T1. In the low power mode LP_MODE, the skip clock signal PSK_CLK having the high level and the inverted skip clock signal PSK_CLK_B having the low level may be maintained.

In a time period after the eleventh time T11, the switching controller 627 may generate the switching control signal PWM having the pulse in the same manner as in the time period before the ninth time T9. Here, in a time period between a thirteenth time T13 and a fifteenth time T15, the switching control signal PWM may have the minimum on-time TMIN_ON.

The minimum on-time TMIN_ON of the switching control signal PWM may be determined based on the skip clock signal PSK_CLK, the threshold current ITH may be determined based on the minimum on-time TMIN_ON of the switching control signal PWM, and the power consumption of the second converter 620' may be determined based on the threshold current ITH.

As such, in the second converter 620' according to an embodiment of the present invention, the switching control signal PWM may be adjusted based on the skip clock signal PSK_CLK, and the threshold current ITH may be adjusted. Accordingly, the threshold current ITH may be adjusted such that a flicker is effectively prevented in an image while the power consumption of the second converter 620' decreases.

Figure 15:
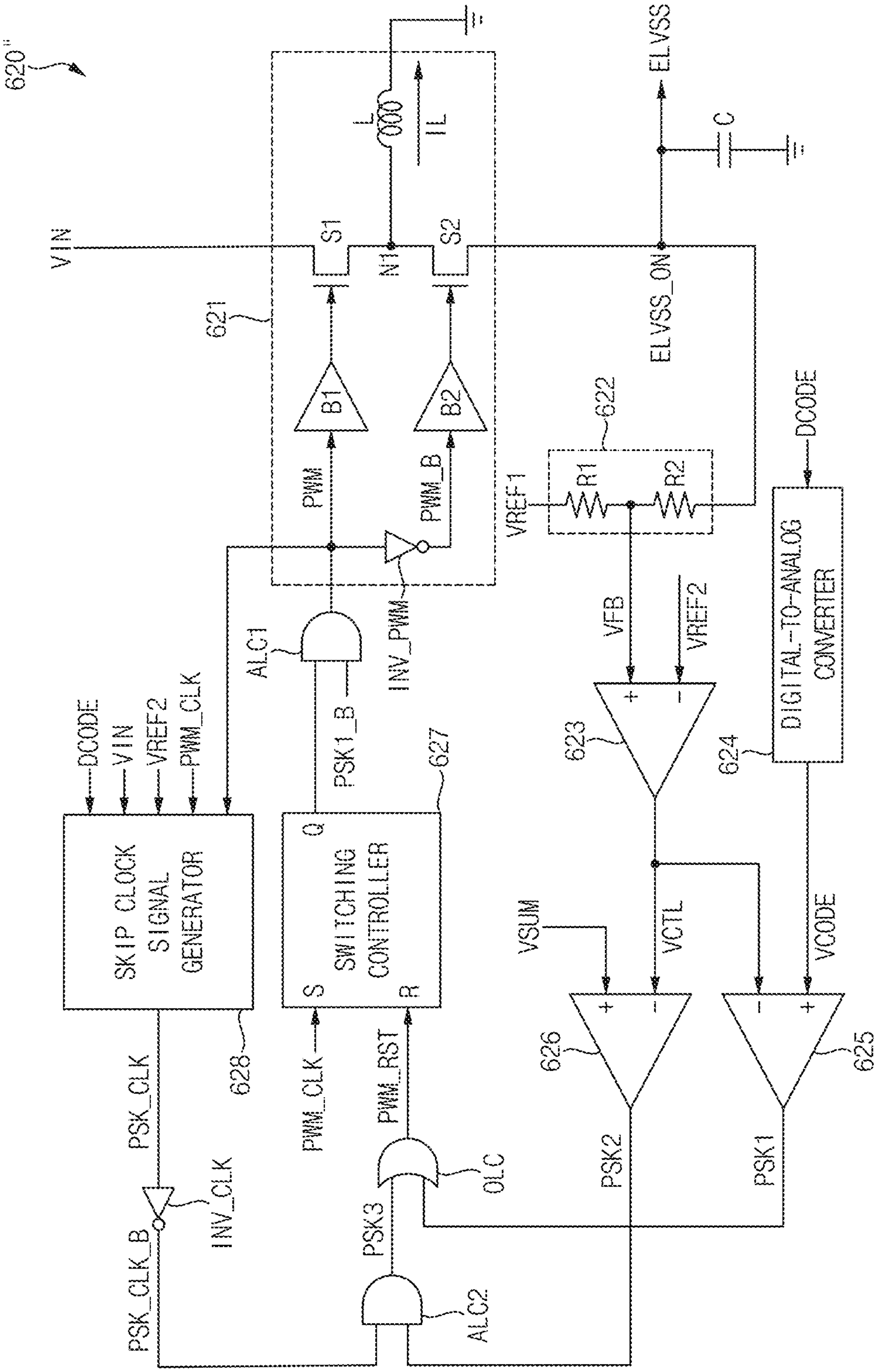
FIG. 15 is a block diagram illustrating a second converter according to an embodiment of the present invention.

FIG. 15 is a block diagram illustrating a second converter 620" according to an embodiment of the present invention.

Referring to FIGS. 1 to 6 and FIG. 15, a second converter 620" may receive an input voltage VIN and generate a second power voltage ELVSS using the input voltage VIN. The second converter 620 may operate in a low power mode LP_MODE or a normal mode N_MODE depending on a load IPL based on a threshold current ITH.

The second converter 620" may include a switcher 621, a feedback voltage generator 622, an amplifier 623, a digital-to-analog converter 624, a first comparator 625, a second comparator 626, a switching controller 627, a skip clock signal generator 628, an OR circuit OLC, a clock inverter INV_CLK, a second logical product circuit ALC2, and a capacitor C.

The second converter 620" of FIG. 15 is a combination of a second converter 620 of FIG. 7 and a second converter 620' of FIG. 13. Therefore, in the second converter 620 according to an embodiment of the present invention, the switching control signal PWM may be adjusted based on the code voltage VCODE or the skip clock signal PSK_CLK, and the threshold current ITH may be adjusted. Accordingly, the threshold current ITH may be adjusted such that a flicker is effectively prevented in an image while the power consumption of the second converter 620" decreases.

Figure 16:
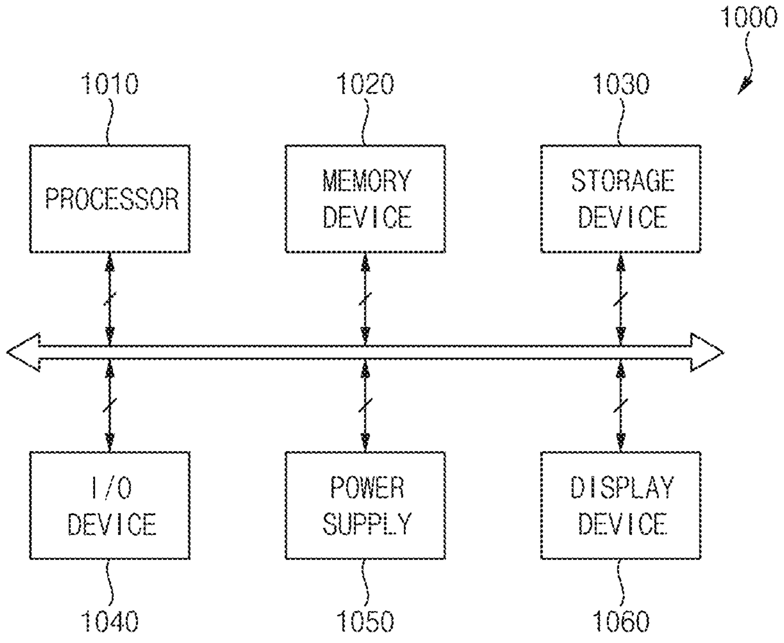
FIG. 16 is a block diagram illustrating an electronic device.
Figure 17:
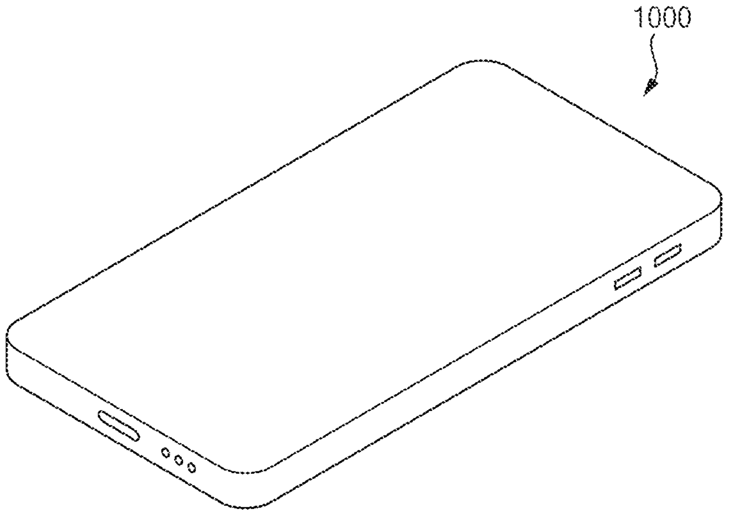
FIG. 17 is a diagram illustrating an embodiment in which the electronic device of FIG. 16 is implemented as a smart phone.

FIG. 16 is a block diagram illustrating an electronic device 1000. FIG. 17 is a diagram illustrating an embodiment in which the electronic device 1000 of FIG. 16 is implemented as a smart phone.

Referring to FIGS. 16 and 17, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic devices, and the like.

In an embodiment, as shown in FIG. 17, the electronic device 1000 may be implemented as the smart phone. However, the electronic device 1000 is not limited thereto. For another example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touchpad, a touchscreen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. For example, the inventions may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A DC-DC converter for generating a panel power voltage using an input voltage, comprising:

a first switching element;

a second switching element connected to the first switching element;

an inductor connected to the first switching element and the second switching element; and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current, wherein the threshold current is adjusted based on the switching control signal, wherein the DC-DC converter is configured to adjust the threshold current by adjusting a minimum on-time of the switching control signal, wherein the DC-DC converter further comprises a first skip comparator, a second skip comparator, and a logical sum circuit, wherein the first skip comparator is configured to generate a first skip signal, wherein the second skip comparator is configured to compare a sum voltage including information on an inductor current flowing in the inductor with a control voltage to generate a second skip signal, wherein the logical sum circuit is configured to perform a logical sum operation on the first skip signal and the second skip signal to generate the reset signal, and wherein the reset signal is generated based on the first skip signal and the second skip signal.

2. The DC-DC converter of claim 1, wherein, the low power mode is a Pulse Skip Mode (PSM), and the normal mode is a Discontinuous Conduction Mode (DCM) or a Continuous Conduction Mode (CCM).

3. The DC-DC converter of claim 1, wherein, when the load is less than the threshold current, the switching controller is configured to operate in the low power mode, and when the load is greater than or equal to the threshold current, the switching controller is configured to operate in the normal mode.

4. The DC-DC converter of claim 1, wherein the first switching element is turned on in response to a switching control signal having an on-duty, and the second switching element is turned on in response to a switching control signal having an off-duty.

5. The DC-DC converter of claim 1, wherein the DC-DC converter is configured to adjust a ripple of the panel power voltage by adjusting the minimum on-time of the switching control signal.

6. The DC-DC converter of claim 1, wherein the DC-DC converter is configured to adjust a number of pulses of a switching control signal to be skipped by adjusting the minimum on-time of the switching control signal and resetting the switching control signal based on the reset signal.

7. The DC-DC converter of claim 1, wherein the first skip comparator is configured to compare the control voltage including information on the panel power voltage with a code voltage to generate the first skip signal.

8. The DC-DC converter of claim 7, wherein the DC-DC converter is configured to adjust the minimum on-time of the switching control signal based on the code voltage.

9. The DC-DC converter of claim 8, wherein the DC-DC converter further comprises a digital-to-analog converter configured to generate the code voltage based on a digital code, and wherein the code voltage is adjusted based on the digital code.

10. The DC-DC converter of claim 7, wherein the DC-DC converter further comprises a first logical product circuit configured to mask the switching control signal using a first inverted skip signal which is an inverted signal of the first skip signal.

11. A display device, comprising:

a display panel including pixels; and a DC-DC converter configured to generate a panel power voltage using an input voltage to provide to the display panel, wherein the DC-DC converter includes:

a first switching element;

a second switching element connected to the first switching element;

an inductor connected to the first switching element and the second switching element; and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current, and wherein the threshold current is adjusted based on the switching control signal, wherein the DC-DC converter is configured to adjust the threshold current by adjusting a minimum on-time of the switching control signal, wherein the DC-DC converter further comprises a first skip comparator, a second skip comparator, and a logical sum circuit, wherein the first skip comparator is configured to generate a first skip signal, wherein the second skip comparator is configured to compare a sum voltage including information on an inductor current flowing in the inductor with a control voltage to generate a second skip signal, wherein the logical sum circuit is configured to perform a logical sum operation on the first skip signal and the second skip signal to generate the reset signal, and wherein the reset signal is generated based on the first skip signal and the second skip signal.

12. The display device of claim 11, wherein the DC-DC converter is configured to adjust a ripple of the panel power voltage by adjusting the minimum on-time of the switching control signal.

13. An electronic device, comprising:

a display panel including pixels;

a DC-DC converter configured to generate a panel power voltage using an input voltage to provide to the display panel; and a power supply configured to provide a power to the display panel and the DC-DC converter, wherein the DC-DC converter includes:

a first switching element;

a second switching element connected to the first switching element;

an inductor connected to the first switching element and the second switching element; and a switching controller configured to generate a switching control signal for turning on the first switching element or the second switching element in response to a switching control clock signal, to reset the switching control signal in response to a reset signal, and to operate in a low power mode or a normal mode according to a load, which is a panel current, based on a threshold current, and wherein the threshold current is adjusted based on the switching control signal, wherein the DC-DC converter is configured to adjust the threshold current by adjusting a minimum on-time of the switching control signal, wherein the DC-DC converter further comprises a first skip comparator, a second skip comparator, and a logical sum circuit, wherein the first skip comparator is configured to generate a first skip signal, wherein the second skip comparator is configured to compare a sum voltage including information on an inductor current flowing in the inductor with a control voltage to generate a second skip signal, wherein the logical sum circuit is configured to perform a logical sum operation on the first skip signal and the second skip signal to generate the reset signal, and wherein the reset signal is generated based on the first skip signal and the second skip signal.

* * * * *